(12) United States Patent
Kamiya et al.

(10) Patent No.: US 9,217,680 B2
(45) Date of Patent: Dec. 22, 2015

(54) SENSOR DEVICE, SENSOR MODULE, ROBOT AND METHOD OF MANUFACTURING SENSOR DEVICE

(71) Applicant: Seiko Epson Corporation, Tokyo (JP)

(72) Inventors: Toshiyuki Kamiya, Fujimi (JP); Hideaki Oka, Minowa (JP); Takanobu Matsumoto, Minowa (JP)

(73) Assignee: Seiko Epson Corporation (JP)

( * ) Notice: Subject to any disclaimer, the term of this patent is extended or adjusted under 35 U.S.C. 154(b) by 46 days.

(21) Appl. No.: 13/718,099

(22) Filed: Dec. 18, 2012

(65) Prior Publication Data

US 2013/0152700 A1 Jun. 20, 2013

(30) Foreign Application Priority Data

Dec. 20, 2011 (JP) ................. 2011-278969

(51) Int. Cl.
| | |
|---|---|
| *G01L 1/16* | (2006.01) |
| *B25J 9/00* | (2006.01) |
| *G01L 5/16* | (2006.01) |
| *G01L 5/22* | (2006.01) |
| *B25J 13/08* | (2006.01) |

(52) U.S. Cl.
CPC ... *G01L 1/16* (2013.01); *B25J 9/00* (2013.01); *B25J 13/085* (2013.01); *G01L 5/167* (2013.01); *G01L 5/226* (2013.01); *Y10T 29/42* (2015.01)

(58) Field of Classification Search
CPC .................................. G01L 1/16; B25J 19/06
USPC ...................................... 73/862.043
See application file for complete search history.

(56) References Cited

U.S. PATENT DOCUMENTS

| | | | |
|---|---|---|---|
| 3,566,163 A | 2/1971 | Fischer et al. | |
| 4,802,371 A | 2/1989 | Calderara et al. | |
| 5,297,430 A | 3/1994 | Sonderegger et al. | |
| 7,659,654 B2 * | 2/2010 | Kondo ......................... | 310/330 |
| 8,556,227 B2 * | 10/2013 | Buestgens et al. ........ | 251/129.01 |
| 2003/0107302 A1 | 6/2003 | Birth et al. | |
| 2011/0185817 A1 | 8/2011 | Kummer et al. | |

FOREIGN PATENT DOCUMENTS

| | | |
|---|---|---|
| JP | 64-035331 | 2/1989 |
| JP | 04-231827 | 8/1992 |
| JP | 11-037860 | 2/1999 |
| JP | 2003-069104 A | 3/2003 |

* cited by examiner

*Primary Examiner* — Lisa Caputo
*Assistant Examiner* — Octavia D. Hollington
(74) *Attorney, Agent, or Firm* — Harness, Dickey & Pierce, P.L.C.

(57) ABSTRACT

A sensor device includes a package, a sensor element that is disposed in the package, and a lid that seals the package, in which the sensor element includes a contacting surface that comes in contact with the lid, the package includes a joint surface which is joined to the lid, and the contacting surface and the joint surface are not on the same flat surface.

2 Claims, 15 Drawing Sheets

$Fx = Fx1 + Fx2 + Fx3 + Fx4$ $Fy = Fy1 + Fy2 + Fy3 + Fy4$ $Fz = Fz1 + Fz2 + Fz3 + Fz4$ $Mx = b \times (Fz4 - Fz2)$ $My = a \times (Fz3 - Fz1)$ $Mz = b \times (Fz2 - Fz4) + a \times (Fy1 - Fy3)$

SENSOR DEVICE, SENSOR MODULE, ROBOT AND METHOD OF MANUFACTURING SENSOR DEVICE

BACKGROUND

1. Technical Field

The present invention relates to a sensor device, a sensor module, a robot, and a method of manufacturing a sensor device.

2. Related Art

In the related art, a force sensor disclosed in JP-A-4-231827 is known as a force sensor used with piezoelectric materials. The disclosed force sensor has a configuration in which a signal electrode 15 shown in FIG. 15 of JP-A-4-231827 is interposed between crystalline circular plates 16 which are piezoelectric materials, and a plurality of measuring elements which are interposed between metal cover circular plates 17 are disposed in a metal ring 14 by welding as shown in FIG. 4 of JP-A-4-231827.

FIG. 13 shows a sensor device of the related art. As shown in FIG. 13, a sensor device 200 includes a sensor element 214, a metallic package 202 including a recess that accommodates the sensor element 214, a metallic plate-like lid 204 which is joined to an upper surface (joint surface 224) which is an outer periphery of an opening portion 220 of the recess of the package 202 and comes in contact with the sensor element 214.

In the sensor element 214, in a state where two crystal plates 216 having the same cut surface with the sensor element are opposed each other, a sensing electrode 218 is interposed therebetween. The upper surface of the crystal plate 216 is a contacting surface 222 of the sensor element 214, and comes in contact with the lid 204.

Meanwhile, a coaxial connector 206 is attached to the side surface of the package 202. The coaxial connector 206 includes an outer periphery portion 208 and a center conductor 210, an insulating resin 212 is filled therebetween, and the outer periphery portion 208 and the center conductor 210 are electrically insulated from each other. Herein, the outer periphery portion 208 is short-circuited with the package 202 and the lid 204, and the center conductor 210 is electrically connected to the sensing electrode 218.

The sensor device 200 is interposed between pressurization plates (not shown) to receive pressure, and the lid 204 transfers a force (pressure) to the contacting surface 222 of the sensor element 214. Then, a force (pressure) to be applied to the crystal plates 216 changes according to an external force to be applied to the pressurization plates. The crystal plates 216 output (induce) an electric charge accompanied with the applied force to the sensing electrode 218 by a piezoelectric effect. Accordingly, it is possible to sense an external force applied to the sensor device 200 by monitoring an amount of change in an output electric charge due to the change of the force (pressure) through the coaxial connector 206, with an output of the signal in a case of pressurization only as a reference.

Herein, in the sensor device 200, the sensor element 214 is sealed by the lid 204 in a state where the inside of the package 202 is full of dry air, so that the electric charge induced from the crystal plate 216 does not leak to the external portion by moisture or the like.

The force sensor disclosed in JP-A-4-231827 has a structure in which a signal electrode is interposed between crystalline circular plates, and the crystalline circular plates are interposed between metallic cover circular plates. In a case of attaching this to a metallic ring by welding, the individual portions such as a signal electrode and the like have dimensional errors which become unevenness of the welded portion, and there is a concern that gaps may be generated in welding. Accordingly, in a state of a poor external environment such as high humidity, there is a concern that the electric charge may leak to the external portion by infiltration of moisture to the sensor element, so that a stable measurement is difficult.

In the sensor device of the related art shown in FIG. 13, in some cases, a height of the contacting surface 222 of the sensor element 214 accommodated in the package 202 and a height of a joint surface 224 which is an outer periphery of the opening portion 220 of the recess of the package 202 do not coincide with each other.

FIGS. 14A and 14B show schematic views of the sensor device (height of contacting surface<height of joint surface) of the related art. FIG. 14A shows a schematic view before applying a force to the lid, and FIG. 14B shows a schematic view after applying the force to the lid.

As shown in FIG. 14A, in a case where the height of the contacting surface 222 of the sensor element 214 is lower than the height of the joint surface 224, the lid 204 is joined to the package 202. Then, a gap 226 is formed without a contact of the lid 204 and the contacting surface 222 of the sensor element 214.

FIGS. 15A to 15C show schematic views of the sensor device (height of contacting surface>height of joint surface) of the related art. FIG. 15A shows a schematic view before joining to the lid, FIG. 15B shows a schematic view after joining to the lid and before applying a force to the lid, and FIG. 15C shows a schematic view after applying the force to the lid.

As shown in FIG. 15A, in a case where the height of the contacting surface 222 of the sensor element 214 is higher than the height of the joint surface 224 of the package 202, when the lid 204 is joined to the package 202, the state shown in FIG. 15B is realized. That is, the center portion of the lid 204 is raised, and an outer edge of the contacting surface 222 of the sensor element 214 comes in contact with the lid 204, however, a gap 228 is formed between the center portion of the contacting surface 222 of the sensor element 214 and the lid 204.

In any case, when the force (including the pressurization described above) is applied to the lid 204, the gaps 226 and 228 described above are eliminated. However, as shown in FIG. 14B, a region which is on the outer side with respect to the sensor element 214 of the lid 204 and on the inner side with respect to edge of the opening portion 220 in a plan view when seen in a depth direction of the recess of the package 202, receives stress in a direction (direction of arrow 230) toward to the center of the lid 204. As shown in FIG. 15C, the region which is on the outer side with respect to the sensor element 214 of the lid 204 and on the inner side with respect to the edge of the opening portion 220 in a plan view, receives stress in a direction (direction of arrow 232) radiating from the center of the lid 204. Accordingly, in any case, shear stress (a direction of arrow 234 is a direction of stress) is concentrically applied to the inner edge portion of the sensor element side which on the inner side with respect to the joint portion (joint surface 224) obtained by joining the lid 204 and the package 202. Further, in the sensor device 200 to which a force is repeatedly applied, there is a concern that stress may be concentrated on the inner edge portion of the sensor element side of the joint portion, and the joint of the lid 204 and the package 202 will be degraded, thereby breaking the airtight sealing.

SUMMARY

An advantage of some aspects of the invention is to provide a sensor device, a sensor module, a robot, and a method of manufacturing the sensor device to stably realize an air-tight sealing of a sensor element accommodated in a package over a long period of time, by employing a structure in which breakage of the package is not likely to occur.

The invention can be implemented as the followings forms or application examples.

Application Example 1

This application example is directed to a sensor device includes: a first member that includes a recess; a sensor element that is disposed in the recess and includes a piezoelectric body; and a second member that is joined to the first member and seals the recess of the first member, in which the sensor element includes a contacting surface that comes in contact with the second member, the first member includes a joint surface that is joined to the second member, and the contacting surface and the joint surface are not the same flat surface.

According to the configuration, the second member comes in contact with the contacting surface and joined to the joint portion. Accordingly, it is possible to suppress the concentration of stress on the joint portion of the first member and the second member. Thus, it is possible to provide a sensor device which stably realizes air-tight sealing of the sensor element accommodated in the first member over a long period of time, by employing a structure in which a breakage of the joint portion is not likely to occur.

Application Example 2

This application example is directed to the sensor device according to Application Example 1, wherein the second member includes a first flat portion that is disposed on the same flat surface as the contacting surface and a second flat portion that is disposed on the same flat surface as the joint surface, and the first flat portion of the second member comes in contact with the contacting surface.

According to the configuration, a level difference is formed in the second member according to a difference in height between the joint surface and the contacting surface. In doing so, the first flat portion comes in contact with the contacting surface regardless of the presence or absence of the difference in height between the joint surface and the contacting surface, and the second flat portion is joined to the joint portion. Accordingly, it is possible to suppress the concentration of stress on the joint portion of the first member and the second member. Thus, it is possible to provide a sensor device which stably realizes the air-tight sealing of the sensor element accommodated in the first member over a long period of time, by employing a structure in which a breakage of the joint portion is not likely to occur.

Application Example 3

This application example is directed to the sensor device according to Application Example 1 or 2, wherein the second member includes a flexible portion having flexibility that surrounds the vicinity of the sensor element in a position which is on the inner side with respect to an opening portion of the recess and on the outer side with respect to the sensor element in a plan view when seen in a depth direction of the recess.

According to the configuration, in a joining step of the second member to the first member, the second member is likely deformed, and it is possible to easily perform the joining step.

Application Example 4

This application example is directed to the sensor device according to any one of Application Examples 1 to 3, wherein when a normal direction of the contacting surface is set as a Z axis direction, and directions which are perpendicular to the Z axis direction and perpendicular to each other are set as an X axis direction and a Y axis direction, respectively, the sensor element includes at least one or more of a first sensor element that senses a force in the X axis direction, a second sensor element that senses a force in the Y axis direction, and a third sensor element that senses a force in the Z axis direction.

According to the configuration, it is possible to sense a force in an arbitrary direction according to the intended purpose.

Application Example 5

This application example is directed to a sensor module including: a first member that includes a recess, a sensor element that is disposed in the recess and includes a piezoelectric body, and a second member that is joined to the first member and seals the recess of the first member; a first plate that comes in contact with the first member; a second plate that comes in contact with the second member; and a fastening portion that fastens the first plate and the second plate, in which the sensor element includes a contacting surface that comes in contact with the second member, the first member includes a joint surface that is joined to the second member, and the contacting surface and the joint surface are not the same flat surface.

According to the configuration, it is possible to provide a sensor module which stably realizes air-tight sealing of the sensor element accommodated in the first member over a long period of time, by employing a structure in which a breakage of the joint portion is not likely to occur, with the same reason as in Application Example 1.

Application Example 6

This application example is directed to a force sensing apparatus including the sensor device according to any one of Application Examples 1 to 4.

According to the configuration, it is possible to provide a force sensing apparatus which stably realizes air-tight sealing of the sensor element accommodated in the first member over a long period of time, by employing a structure in which a breakage of the joint portion is not likely to occur, with the same reason as in Application Example 1.

Application Example 7

This application example is directed to a sensor module including: a first member that includes a recess; a sensor element that is disposed in the recess and includes a piezoelectric body; a second member that is joined to the first member and seals the recess of the first member; and an electronic circuit that is electrically connected to the sensor element, in which the sensor element includes a contacting surface that comes in contact with the second member, the first member includes a joint surface that is joined to the second member, and the contacting surface and the joint surface are not the same flat surface.

According to the configuration, it is possible to provide a sensor module which stably realizes air-tight sealing of the sensor element accommodated in the first member over a long period of time, by employing a structure in which a breakage of the joint portion is not likely to occur, with the same reason as in Application Example 1.

Application Example 8

This application example is directed to a robot including the force sensing apparatus according to Application Example 6.

According to the configuration, it is possible to provide a robot which stably realizes air-tight sealing of the sensor element accommodated in the first member over a long period of time, by employing a structure in which a breakage of the joint portion is not likely to occur, with the same reason as in Application Example 1.

Application Example 9

This application example is directed to a robot including: a main body portion; an arm portion that is connected to the main body portion; a hand portion that is connected to the arm portion; and a sensor device in the connecting portion of the arm portion and the hand portion, in which the sensor device includes a first member that includes a recess, a sensor element that is disposed in the recess and includes a piezoelectric body, and a second member that is joined to the first member and seals the recess of the first member, the sensor element includes a contacting surface that comes in contact with the second member, the first member includes a joint surface that is joined to the second member, and the contacting surface and the joint surface are not the same flat surface.

According to the configuration, it is possible to provide a robot which stably realizes air-tight sealing of the sensor element accommodated in the first member over a long period of time, by employing a structure in which a breakage of the joint portion is not likely to occur, and senses an external force applied to the arm portion and the hand portion, with the same reason as in Application Example 1.

Application Example 10

This application example is directed to a method of manufacturing a sensor device including: accommodating a sensor element having a piezoelectric body in a recess of a first member; loading a second member on the first member so as to cover the recess of the first member; and joining the second member to the first member in a state where the second member is pressed against the sensor element with a pressing surface of a load applying unit; in which an outer edge of the pressing surface is disposed between an inner edge of the recess and an outer edge of a contacting surface that comes in contact with the second member of the sensor element, in a plan view when seen in a depth direction of the recess.

According to the method, it is possible to manufacture a sensor device which stably realizes air-tight sealing of the sensor element accommodated in the first member over a long period of time, by employing a structure in which a breakage of the joint portion is not likely to occur, with the same reason as in Application Example 1.

Application Example 11

This application example is directed to the method of manufacturing a sensor device according to Application Example 10, further includes: pressing the second member against the first member with a second load applying unit and deforming the second member, in a state of pressing the second member against the sensor element with the pressing surface of the load applying unit; and forming a first flat portion that is disposed on the same flat surface as the contacting surface and comes in contact with the contacting surface and a second flat portion that is disposed on the same flat surface as a joint surface for joining the first member and the second member, on the second member.

According to the method, even if there is a difference in height between the contacting surface and joint surface, since the level difference between the first flat portion and the second flat portion is formed according to the difference in height, the first flat portion comes in contact with the contacting surface regardless of the presence or absence of the difference in height between the contacting surface and the joint surface. According to the method, it is possible to manufacture a sensor device which stably realizes air-tight sealing of the sensor element accommodated in the first member over a long period of time, by employing a structure in which a breakage of the joint portion is not likely to occur, with the same reason as in Application Example 1. Even if variations of the difference in height are generated, since it is possible that the first flat portion comes in contact with the contacting surface, it is possible to obtain high-yield manufacturing of the sensor device.

BRIEF DESCRIPTION OF THE DRAWINGS

The invention will be described with reference to the accompanying drawings, wherein like numbers reference like elements.

FIGS. 1A and 1B are schematic views of a sensor device of a first embodiment, in which FIG. 1A is a plane view and FIG. 1B is a cross-sectional view taken along a line A-A of FIG. 1A.

FIGS. 2A and 2B are schematic views showing manufacturing steps of a sensor device of a first embodiment, in which FIG. 2A is a schematic view before seam welding, and FIG. 2B is a schematic view after seam welding.

FIGS. 3A to 3C are schematic views of manufacturing steps of a sensor device of a first embodiment when a gap is formed between a lid and a sensor element, in which FIG. 3A is a schematic view before applying a weight, FIG. 3B is a schematic view after applying the weight, and FIG. 3C is a schematic view after seam welding.

FIGS. 5A and 5B are schematic views of a modification example of a lid of the embodiment, in which FIG. 5A is a plane view, and FIG. 5B is a cross-sectional view taken along a line A-A of FIG. 5A.

FIGS. 14A and 14B are schematic views of a sensor device (height of a contacting surface<height of joint surface) of the related art, in which FIG. 14A is a schematic view before a force is applied to a lid, and FIG. 14B is a schematic view after a force is applied to a lid.

FIGS. 15A to 15C are schematic views of a sensor device (height of a contacting surface<height of joint surface) of the related art, in which FIG. 15A is a schematic view before joining a lid to a package, FIG. 15B is a schematic view after joining to the lid and before applying a force to the lid, and FIG. 15C is a schematic view after applying the force to the lid.

DESCRIPTION OF EXEMPLARY EMBODIMENTS

Figure 1A:
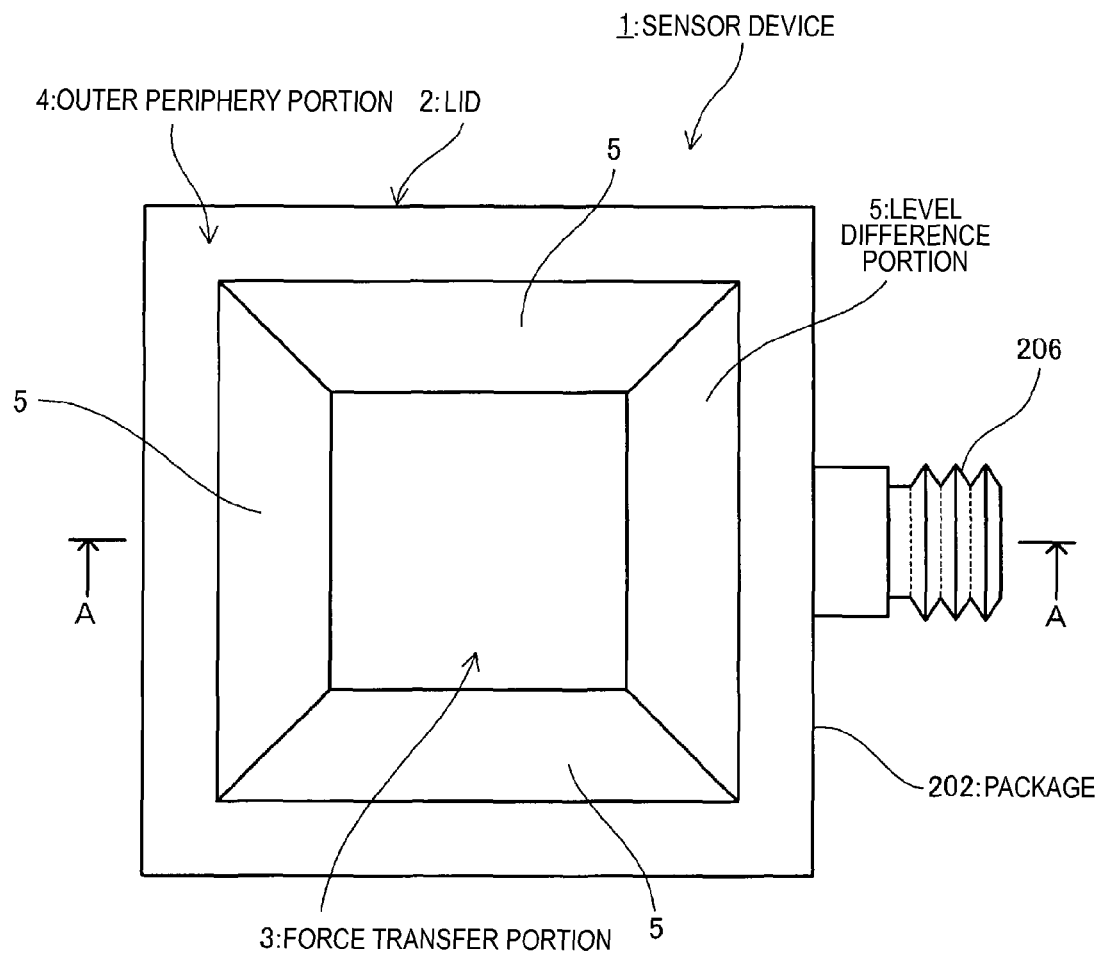

Hereinafter, the invention will be described in detail with reference to embodiments shown in the drawings. However, the invention is not limited to the scope thereof of constituent elements, types, combinations, shapes, relative disposition thereof and the like disclosed in the embodiments, unless otherwise specified, and they are only illustrating examples.

Figure 1B:
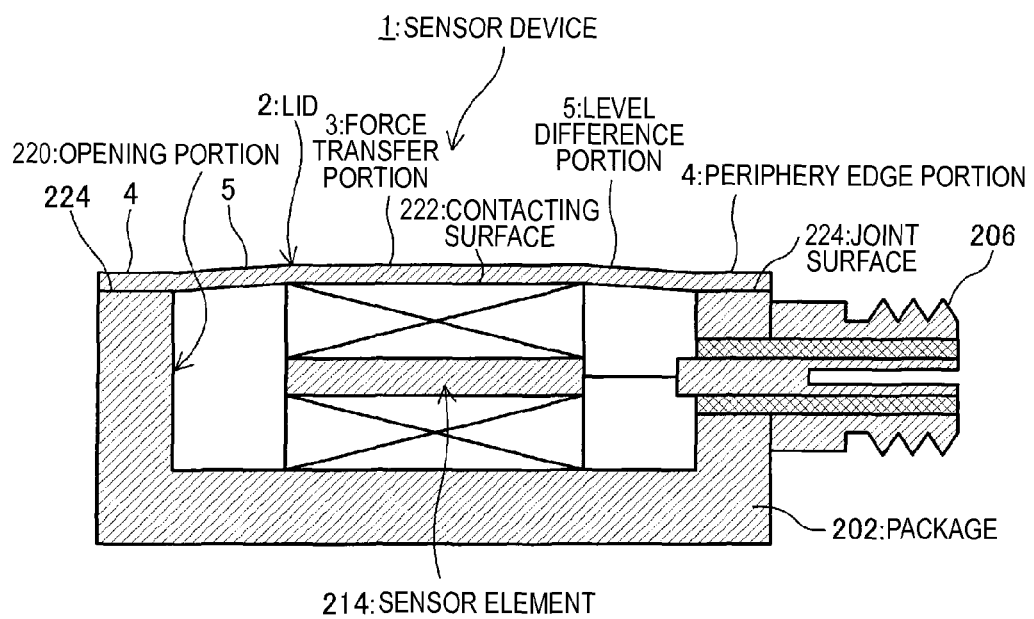

FIGS. 1A and 1B show schematic views of a sensor device of a first embodiment, in which FIG. 1A is a plane view and FIG. 1B is a cross-sectional view taken along a line A-A of FIG. 1A. Since a sensor device 1 of the first embodiment has a common basic configuration with a sensor device 200 of the related art, the same constituent elements have the same reference numerals and the description thereof is omitted except in necessary cases. First, the embodiment will be described using a case where a contacting surface 222 (upper surface) of a sensor element 214 is not disposed on the same flat surface with a joint surface 224 (upper surface) of a package 202 (first member) having a recess, but the contacting surface 222 is disposed higher than the joint surface 224.

The sensor device 1 of the embodiment is mainly configured by the package 202 (first member) having the recess, the sensor element 214, and a plate-like lid 2 (second member). The sensor device 1 of the embodiment has a basic configuration in which the sensor element 214 is accommodated in the package 202, and the lid 2 is joined to the joint surface 224 of the package 202 so as to cover an opening portion 220 of the recess of the package 202. The package 202 has a package structure including the recess, and is formed of metal (or ceramic as will be described later). A level difference portion 5 is formed between a force transfer portion 3 (first flat portion) and a peripheral edge portion 4 (second flat portion) of the lid 2 according to a difference in height between the contacting surface 222 and the joint surface 224 of the sensor element 214, and in the embodiment, the force transfer portion 3 is formed to be protruded compared to the peripheral edge portion 4. Herein, the force transfer portion 3 comes in contact (surface contact) with the contacting surface 222 and the peripheral edge portion 4 is joined to the joint surface 224.

The sensor device 1 of the embodiment is interposed between pressurization plates 82 (FIG. 10) and 92 (FIG. 11) which will be described later, and receives pressure from a normal direction of the contacting surface 222 of the sensor element 214 for example.

The lid 2 which is joined to the package 202 is formed of metal (or ceramic as will be described later) such as stainless steel or Kovar, and configured by the force transfer portion 3, the peripheral edge portion 4, and the level difference portion 5. The force transfer portion 3 (first flat portion) forms a center region of the lid 2 and transfers a force (including pressurization) received from the outside to the contacting surface 222 of the sensor element 214. The outer edge of the force transfer portion 3 is disposed so as to overlap the outer edge of the contacting surface 222 of the sensor element 214 in a plan view (FIG. 1A) when seen in the depth direction of the recess of the package 202. Accordingly, the force transfer portion 3 comes in contact with the entire contacting surface 222 of the sensor element 214. The peripheral edge portion 4 (second flat portion) is disposed in a position to be the peripheral edge portion of the lid 2 and joined to the joint surface 224 of the package 202.

In level difference portion 5, a level difference (level difference of the contacting surface 222 in the normal direction) is formed between the force transfer portion 3 and the periphery edge portion 4. That is, the level difference portion 5 includes a level difference according to a difference in height between the contacting surface 222 and the joint surface 224, and it is possible that the force transfer portion 3 comes in contact with the contacting surface 222 in a state where the periphery edge portion 4 is joined to the joint surface 224. In the embodiment, the level difference portion 5 is formed to be inclined toward the periphery edge portion 4 from the force transfer portion 3.

Next, manufacturing steps of the sensor device 1 of the first embodiment will be described. Herein, steps of accommodating the sensor element 214 in the package 202, and joining the lid 2 and the package 202 by seam welding to seal the sensor element 214 in an air-tight manner will be described.

Figure 2A:
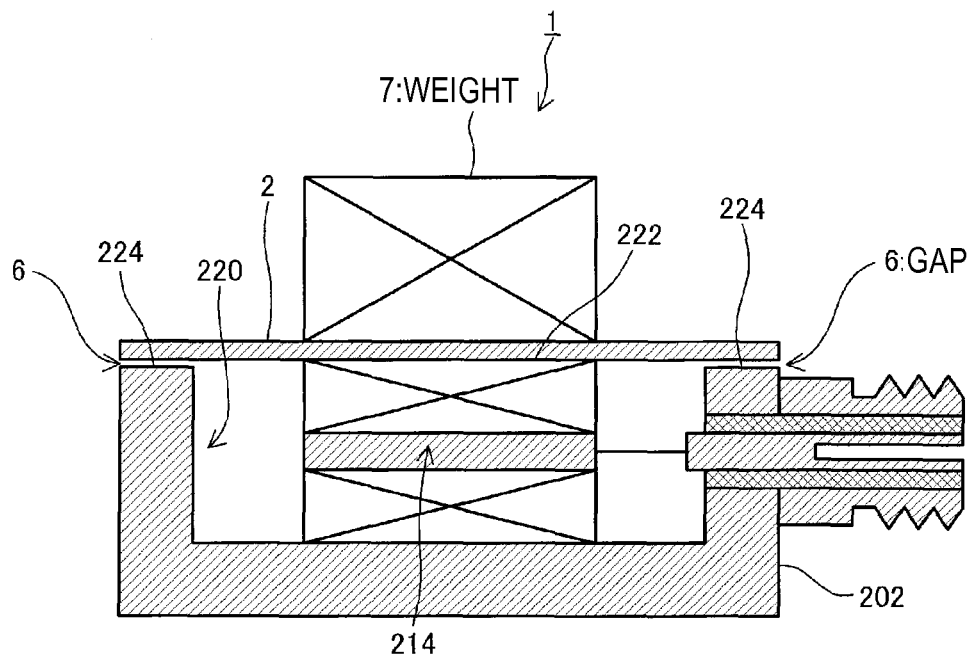
Figure 2B:
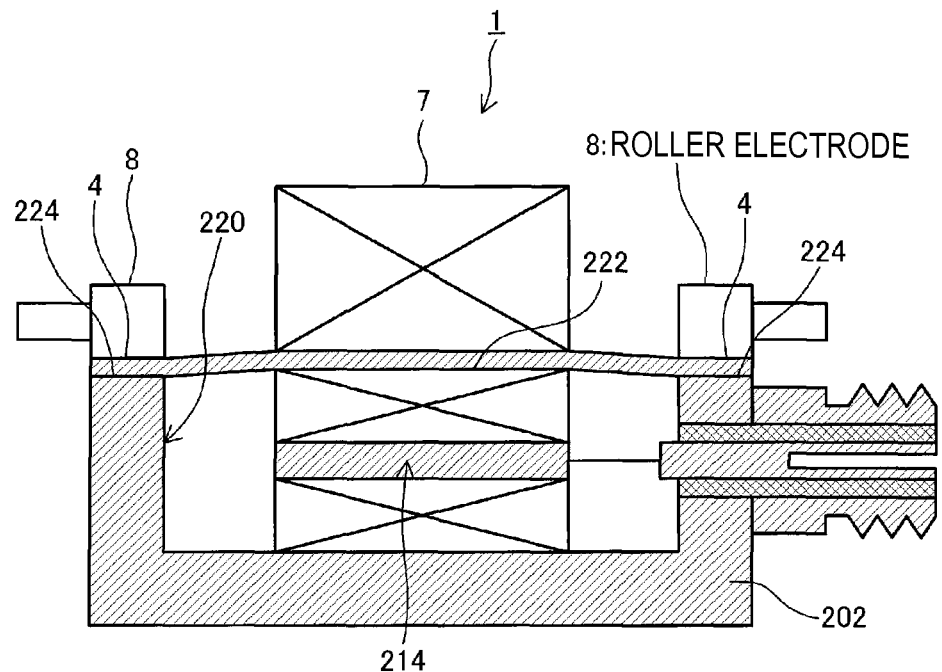

FIGS. 2A and 2B are schematic views showing manufacturing steps of a sensor device of a first embodiment, in which FIG. 2A is a schematic view before seam welding, and FIG. 2B is a schematic view after the seam welding.

First, the lid 2 is loaded on the package 202 in which the sensor element 214 is accommodated. At this time, a portion corresponding to the force transfer portion 3 of the lid 2 is loaded on the contacting surface 222, a gap 6 is formed between a portion corresponding to the periphery edge portion 4 of the lid 2 and the joint surface 224. As shown in FIG. 2A, a weight 7 which is a load applying unit is loaded on the center portion of the lid 2. Herein, the weight 7 includes a bottom surface (pressing surface) which can come in contact with (surface contact) the lid 2, and is set to be directed so that the normal line thereof is parallel to the normal line of the contacting surface 222 of the sensor element 214.

As shown in FIG. 2B, a roller electrode 8 which is a second load applying unit is pressed against a position (joint surface 224) connected to the package 202 of the lid 2 to eliminate the gap 6, and electric current is applied to the roller electrode 8 to join the lid 2 and the package 202 by seam welding. At this time, a position of the lid 2 which opposes to the outer edge of the contacting surface 222 of the sensor element 214 is folded (plastic-deformed), and the force transfer portion 3 (first flat portion) is formed in a position opposing to the contacting surface 222 of the lid 2. In the folding step, the weight 7 maintains flatness on a portion (force transfer portion 3) opposing the contacting surface 222 of the lid 2 by the load thereof, to make it possible that the force transfer portion 3 formed after the folding to come in contact with the contacting surface 222.

At the same time as the folding step described above, the lid 2 is folded (plastic-deformed) by the load of the roller electrode 8 in a position overlapping with the edge side of the sensor element 214 side of the joint surface 224 in the plan view. Then, the roller electrode 8 is applied on the lid 2 so as to be applied on the entire connecting position (joint surface 224). Accordingly, the sensor device 1 can be provided in which the connecting position of the lid 2 and the package 202 becomes the periphery edge portion 4 (second flat portion) of the lid 2, the portion between the periphery edge portion 4 and the force transfer portion 3 becomes the level difference portion 5, and the sensor element 214 is sealed by the lid 2.

However, in a case of mass production of the sensor device 1 of the embodiment, a variation is generated in the difference in height between the height of the contacting surface 222 of the sensor element 214 and the joint surface 224 of the package 202. That is, as described above, in some cases, the height of the contacting surface 222 of the sensor element 214 is lower than the height of the joint surface 224 of the package 202, and vice versa. Accordingly, next, manufacturing steps of the sensor device 1 in a case where the height of the contacting surface 222 is lower than the height of the joint surface 224 will be described.

Figure 3A:
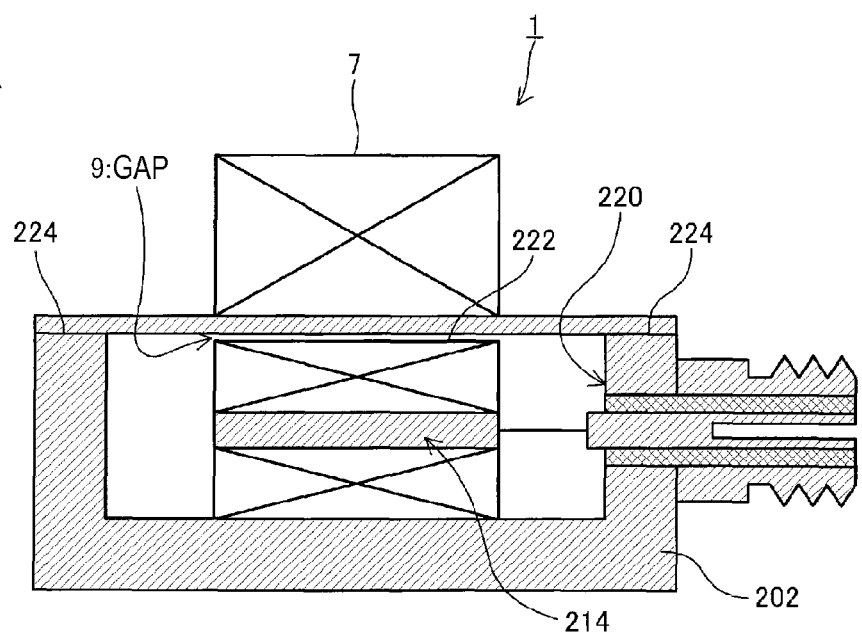
Figure 3B:
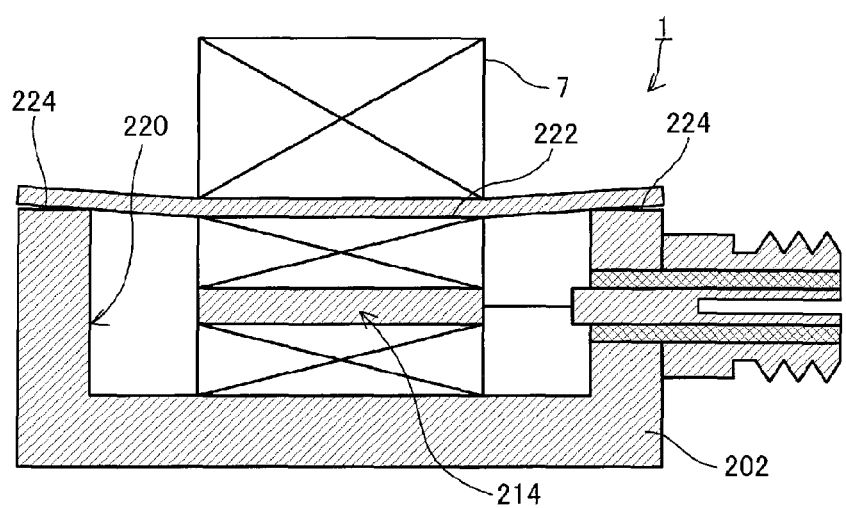
Figure 3C:
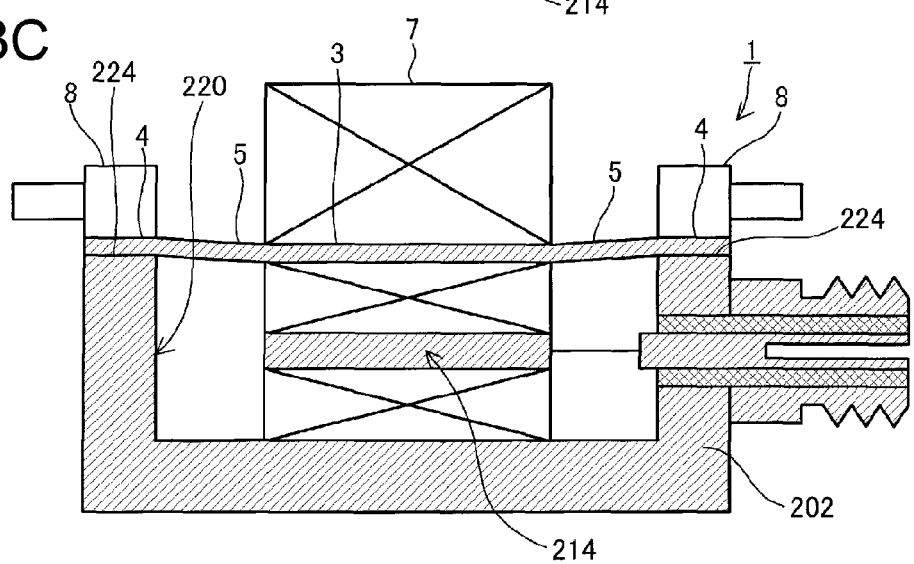

FIGS. 3A to 3C show schematic views of manufacturing steps of the sensor device of the first embodiment when a gap is formed between the lid and the sensor element, in which FIG. 3A is a schematic view before applying the weight, FIG. 3B is a schematic view after applying the weight, and FIG. 3C is a schematic view after seam welding.

First, as shown in FIG. 3A, the lid 2 is loaded on the package 202 (joint surface 224). Then, a gap 9 is formed between the lid 2 and the contacting surface 222 of the sensor element 214. Next, as shown in FIG. 3B, the weight 7 which is the load applying unit is loaded on the center portion of the lid 2 in order to deform the lid 2.

As shown in FIG. 3B, by applying the flat load on the lid 2 using the weight 7, the lid 2 is folded (plastic-deformed) in a position opposing the outer edge of the bottom surface (pressing surface) of the weight 7 of the lid 2. Accordingly, in the lid 2, a portion which on the inner side with respect to the outer edge of the bottom surface (pressing surface) of the weight 7 of the lid 2 in the plan view becomes the force transfer portion 3 (first flat portion), the force transfer portion 3 comes in contact with the contacting surface 222, and the gap 9 is eliminated.

As shown in FIG. 3C, the roller electrode 8 for seam welding which is the second load applying unit is pressed against the connecting position (joint surface 224) of the lid 2 and the package 202, and electric current is applied to the roller electrode 8 to join the lid 2 and the package 202 by seam welding. At this time, the lid 2 is folded (plastic-deformed) by the load of the roller electrode 8 in a position overlapping with the inner edge of the joint surface 224 which is a ring-shaped rectangular in the plan view. Then, the roller electrode 8 is applied to the lid 2 so as to be applied to the entire connecting position (joint surface 224). Accordingly, the connecting position (joint surface 224) of the lid 2 and the package 202 becomes the periphery edge portion 4 (second flat portion) of the lid 2, and the portion between the periphery edge portion 4 and the force transfer portion 3 becomes the level difference portion 5.

In the joining step of the lid of FIGS. 2A to 3C, it is necessary that the force transfer portion 3 is formed at least to come in contact with the entire contacting surface 222. Accordingly, in the joining step of FIGS. 2A to 3C, the bottom surface (pressing surface) of the weight 7 has the same shape and same area as the contacting surface 222, and disposed so that the outer edge of the bottom surface of the weight 7 and the outer edge of the contacting surface 222 are overlapped to each other in the plan view. Thus, it is possible to form the minimum area of the force transfer portion 3.

However, the bottom surface of the weight 7 may be set to be larger area than the contacting surface 222 (in this case, it is not necessary to be the same shape), and may be disposed so that the outer edge of the bottom surface of the weight 7 surrounds the outer edge of the contacting surface 222 in the plan view. That is, in the plan view, the outer edge of the bottom surface (pressing surface) of the weight 7 may be disposed between the inner edge of the recess of the package 202, that is, the inner edge of the joint surface 224 which is a ring-shaped rectangular in the plan view, and the outer edge of the contacting surface 222.

Accordingly, in the joining step of FIGS. 2A to 3C, even when there is an alignment error when loading the weight 7 on the lid 2, the force transfer portion 3 having the area larger than the contacting surface 222 is formed, and disposed so that the outer edge of the force transfer portion 3 surrounds the outer edge of the contacting surface 222 in the plan view. Thus, it is possible that the entire surface of the contacting surface 222 reliably comes in contact with the force transfer portion 3. In the joining step of FIGS. 3A to 3C, the force transfer portion 3 is formed according to the shape of the outer edge of the bottom surface of the weight 7.

Figure 13:
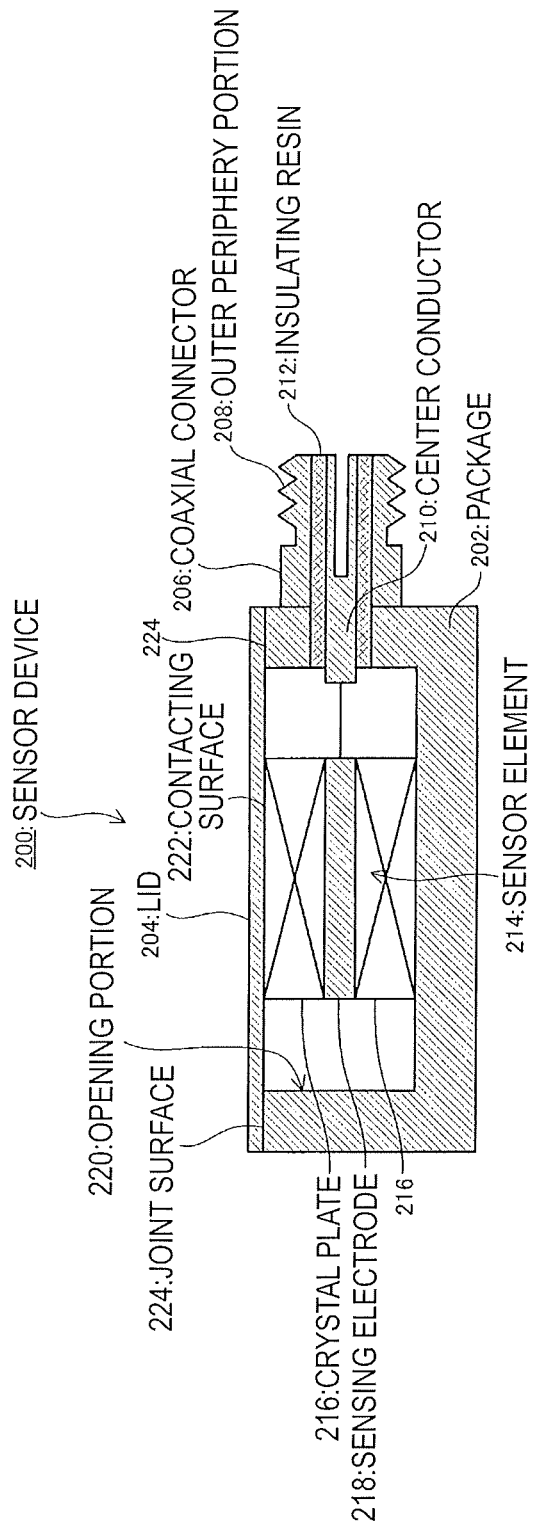
FIG. 13 is a schematic view of a sensor device of the related art.
Figure 14A:
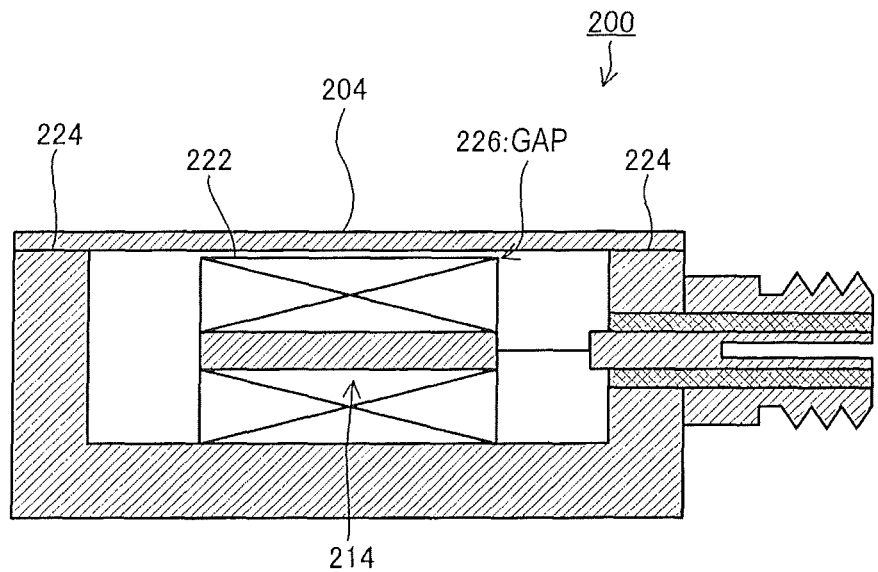
Figure 14B:
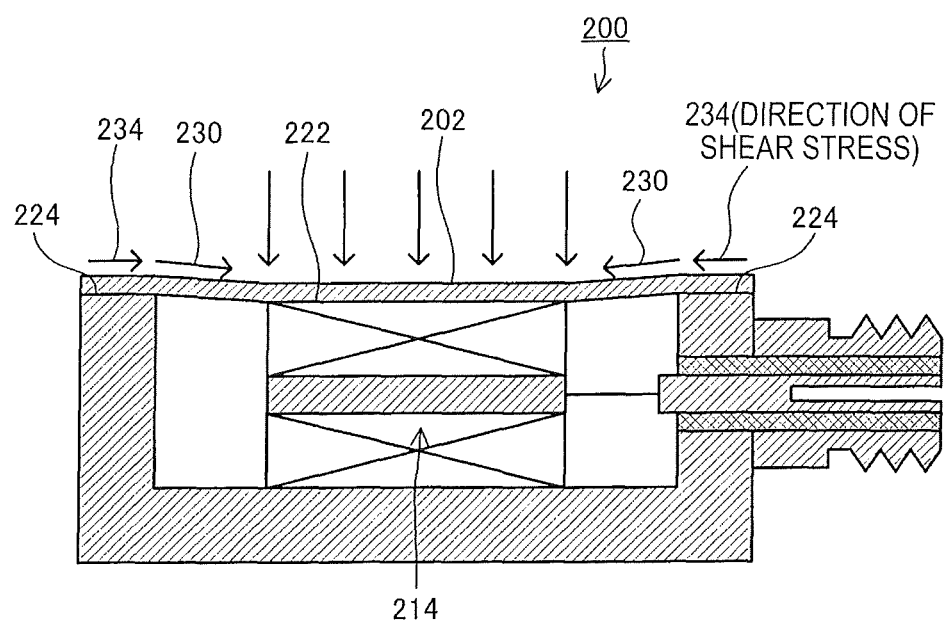
Figure 15A:
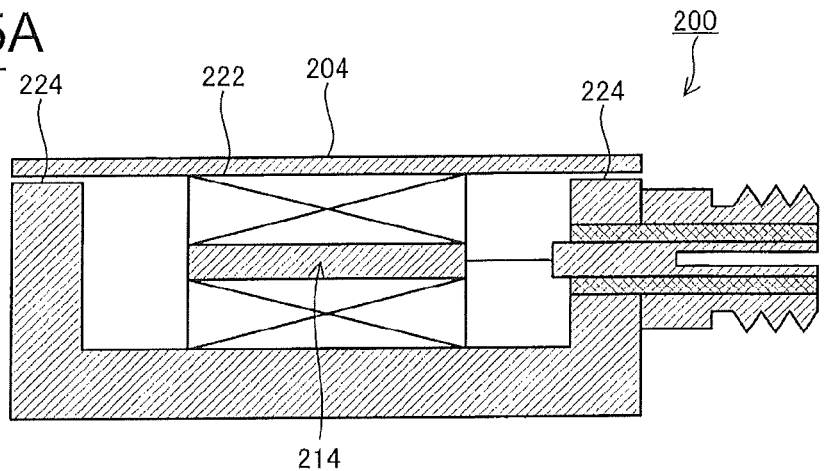
Figure 15B:
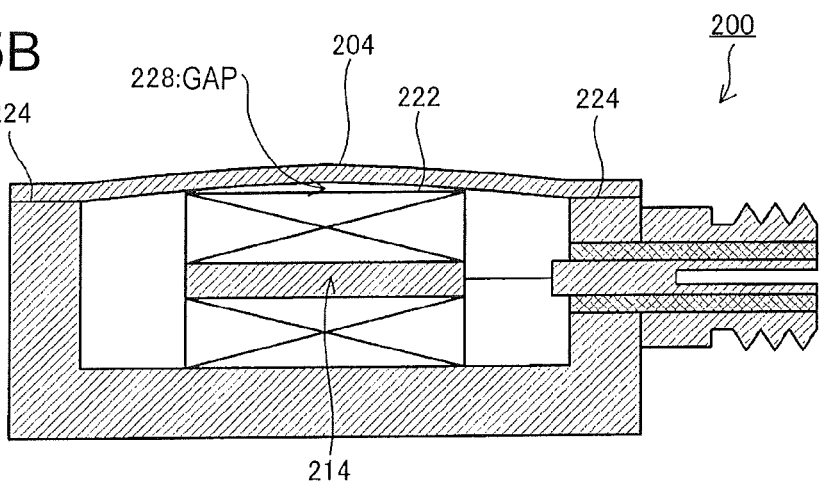
Figure 15C:
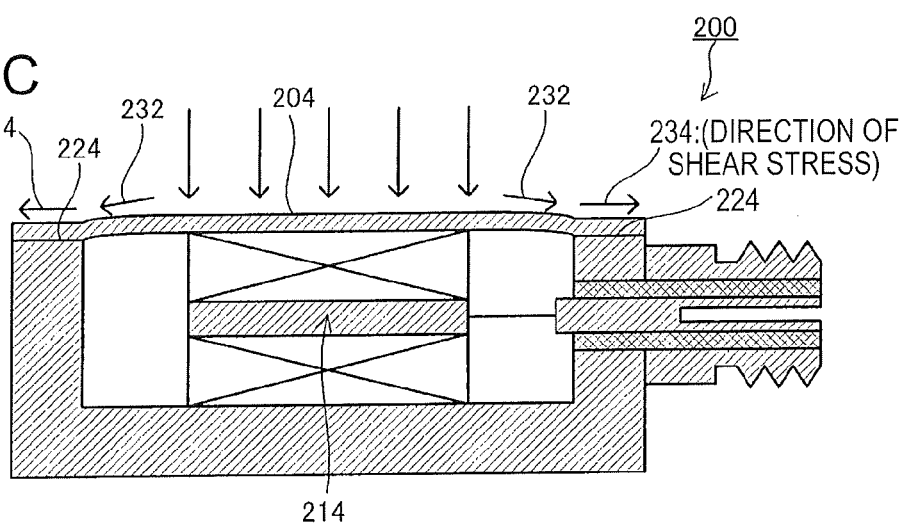

Meanwhile, in the lid 2 shown in FIG. 3C, a level difference is formed in a state where the force transfer portion 3 is recessed compared to the periphery edge portion 4, however the size of the level difference is slight. Thus, it is possible that the pressurization plates 82 (FIG. 10) and 92 (FIG. 11) which will be described later come in contact also with the force transfer portion 3 to apply the pressure to the force transfer portion 3 with the pressurization plates, and the force transfer portion 3 transfers the force to the contacting surface 222. In a case where the heights of the contacting surface 222 and the joint surface 224 coincide with each other, the level difference portion 5 is not formed (see FIG. 13).

In the embodiment, as described above, a step of performing seam welding by applying a load to the periphery edge of the lid 2 with the roller electrode 8, in a state where the load is applied to the center portion of the lid 2 using the weight 7 is employed. Accordingly, even when there is a difference in height between the contacting surface 222 and the joint surface, in order that level difference between the portion (force transfer portion 3) which on the inner side with respect to the level difference portion 5 of the lid 2 and the periphery edge portion 4 is formed according to the difference in height, the force transfer portion 3 comes in contact with the contacting surface 222 regardless of the presence or absence of the difference in height between the contacting surface 222 and the joint surface 224. Thus, it is possible that a part of the force applied to the sensor element 214 absorbed by shear stress with respect to the joint surface 224 becomes small, and the force is sensed with a high degree of precision.

Since the entire force transfer portion 3 comes in contact with the contacting surface 222, when applying the pressure, displacement of the force transfer portion 3 to fill the gap between the force transfer portion and the contacting surface 222 is avoided, and it is possible to significantly reduce the stress concentration with respect to the joint portion (joint surface 224) of the package 202 and the lid 2. Accordingly, it is possible to provide the sensor device 1 which stably realizes the air-tight sealing of the sensor element 214 accommodated in the package 202 over a long period of time, by employing a structure in which the breakage of the joint portion is not likely to occur.

In addition, according to a manufacturing variation of the package 202 and the sensor element 214, even when a variation of the difference in height between the contacting surface 222 and the joint surface 224 is generated, since the force transfer portion 3 comes in contact with the contacting surface 222, it is possible to obtain high-yield manufacturing of the sensor device 1.

In the embodiment, the first member 202 has been described to be the integral structure, however, may be separated into the portion (package base 14 which will be described later) on which the sensor element 214 is loaded, the portion (side wall member 24 which will be described later) surrounding the vicinity of the sensor element 214, and a coaxial connector 206. In the embodiment, the force transfer portion 3 has been described to come in contact with the contacting surface 222, however, the force transfer portion 3 may be joined to the contacting surface 222 using an adhesive or the like.

Figure 4:
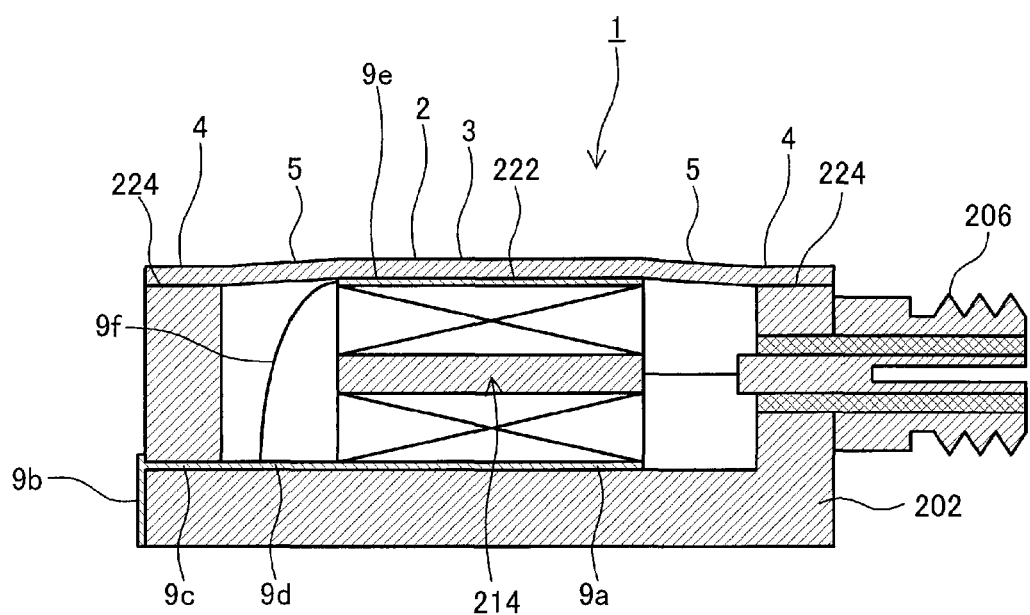
FIG. 4 is a cross-sectional view of a sensor device of a first embodiment when a package and a lid are formed with an insulating body.

FIG. 4 shows a cross-sectional view of the sensor device of the first embodiment when the package and the lid are formed with an insulating body. In a case where the package 202 and the lid 2 are formed with an insulating body such as a ceramic, in the bottom surface of the recess of the package 202, a ground electrode 9a is disposed so as to come in contact with the entire lower surface of the sensor element 214, and a side surface electrode 9b is disposed on the side surface of the outer portion of the package 202. Then, a penetration electrode 9c which penetrates from the side surface electrode 9b to the wall surface of the recess of the package 202 is disposed, and a connection electrode 9d which connects the penetration electrode 9c which is exposed in the wall surface of the recess and the ground electrode 9a is disposed on the bottom surface of the recess of the package 202. Further, a ground electrode 9e is also disposed on the upper surface of the sensor element 214 so as to cover the entire upper surface and the ground electrode 9e and the connection electrode 9d are electrically connected by a wire 9f. In this configuration, since the side surface electrode 9b is grounded, the upper surface and the lower surface of the sensor element 214 are grounded. In this case, the upper surface of the ground electrode 9e becomes the contacting surface 222 of the sensor element 214.

Figure 5A:
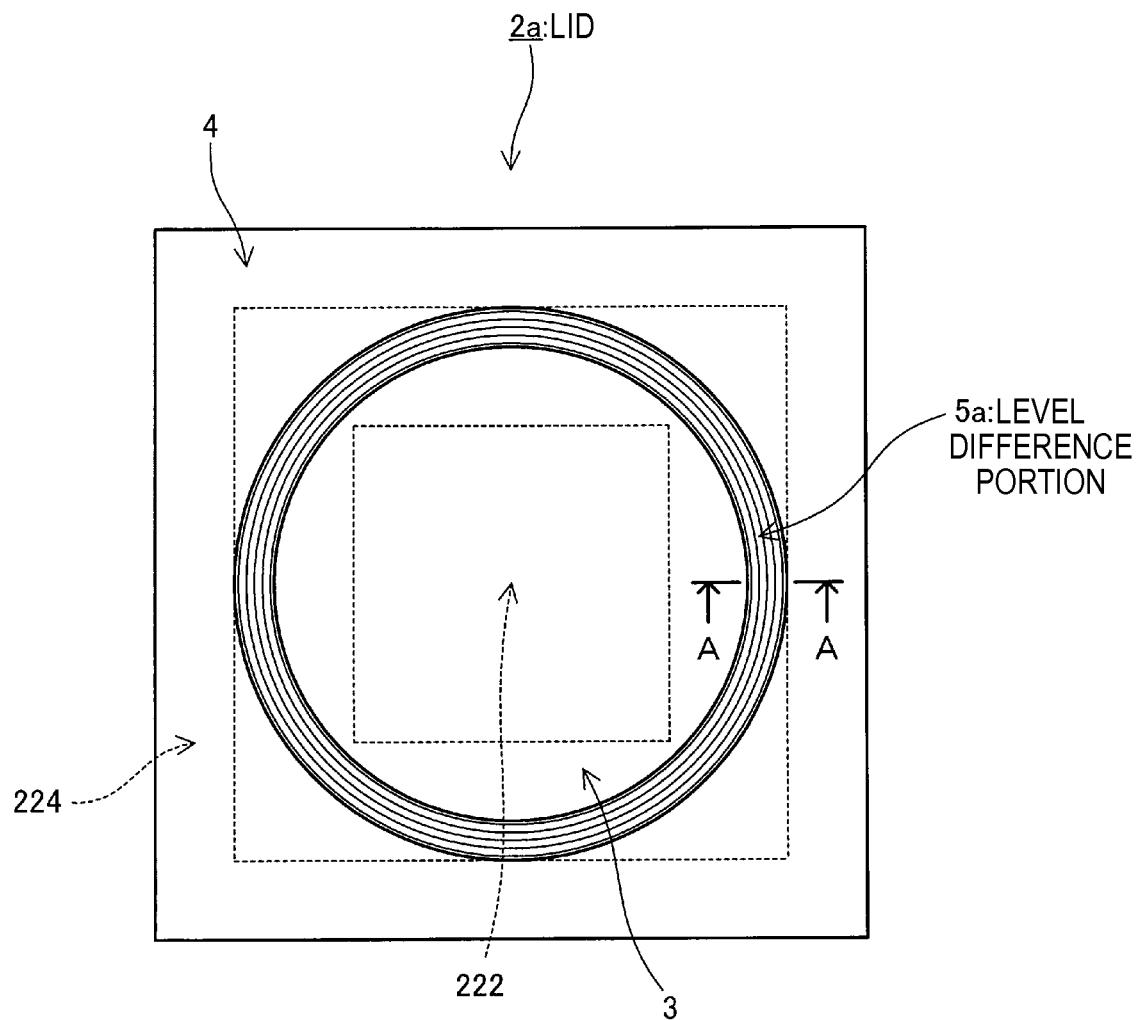
Figure 5B:
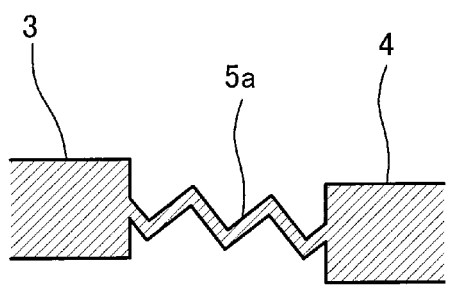

FIGS. 5A and 5B are schematic views of a modification example of the lid of the embodiment, in which FIG. 5A is a plane view, and FIG. 5B is a cross-sectional view taken along a line A-A of FIG. 5A. In a lid 2a shown in FIGS. 5A and 5B, a level difference portion 5a has a circular shape in the plan view. The level difference portion 5a is disposed in a position which is on outer side with respect to the contacting surface 222 and on inner side with respect to the joint surface 224 so as to circle around the contacting surface 222 in the plan view, and is formed as a flexible portion thinner than the force transfer portion 3 and the periphery edge portion 4. This level difference portion 5a is formed by setting the weight described above (bottom surface of the weight) as a circular shape and processing the joining step described above. In this case, as shown in FIG. 5B, the force transfer portion 3 may be provided to protrude more than the periphery edge portion 4 or vice versa.

By setting the level difference portion 5a as the flexible portion formed thinner than the other portions of the lid 2, the level difference portion 5a is easy to be deformed, and it is possible to easily perform the joining step described above. In addition, by setting the level difference portion 5a as a circular shape, when a force (including pressurization) is applied to the lid 2a, it is possible that stress concentration to the specific portions (for example, portions to be corners) of the level difference portion 5a is avoided and durability of the level difference portion 5a is improved.

As shown in FIG. 5B, the level difference portion 5a can be set as a flexible portion which is formed to be thinner than the force transfer portion 3 and the periphery edge portion and has a bellows structure. Accordingly, the level difference portion 5a is further likely to be deformed, and it is possible to easily perform deformation when joining the lid. Herein, when the level difference portion has a bellows structure as the level difference portion 5a, as long as the level difference portion 5a is preferentially deformed over the force transfer portion 3 and the peripheral edge portion 4, the level difference portion 5a need not necessarily be formed thinner, and may have the same thickness as the force transfer portion 3 and the peripheral edge portion 4. Also, the lid 2a (level difference portion 5a) of the modification example can be formed by a press molding or an etching.

Figure 6:
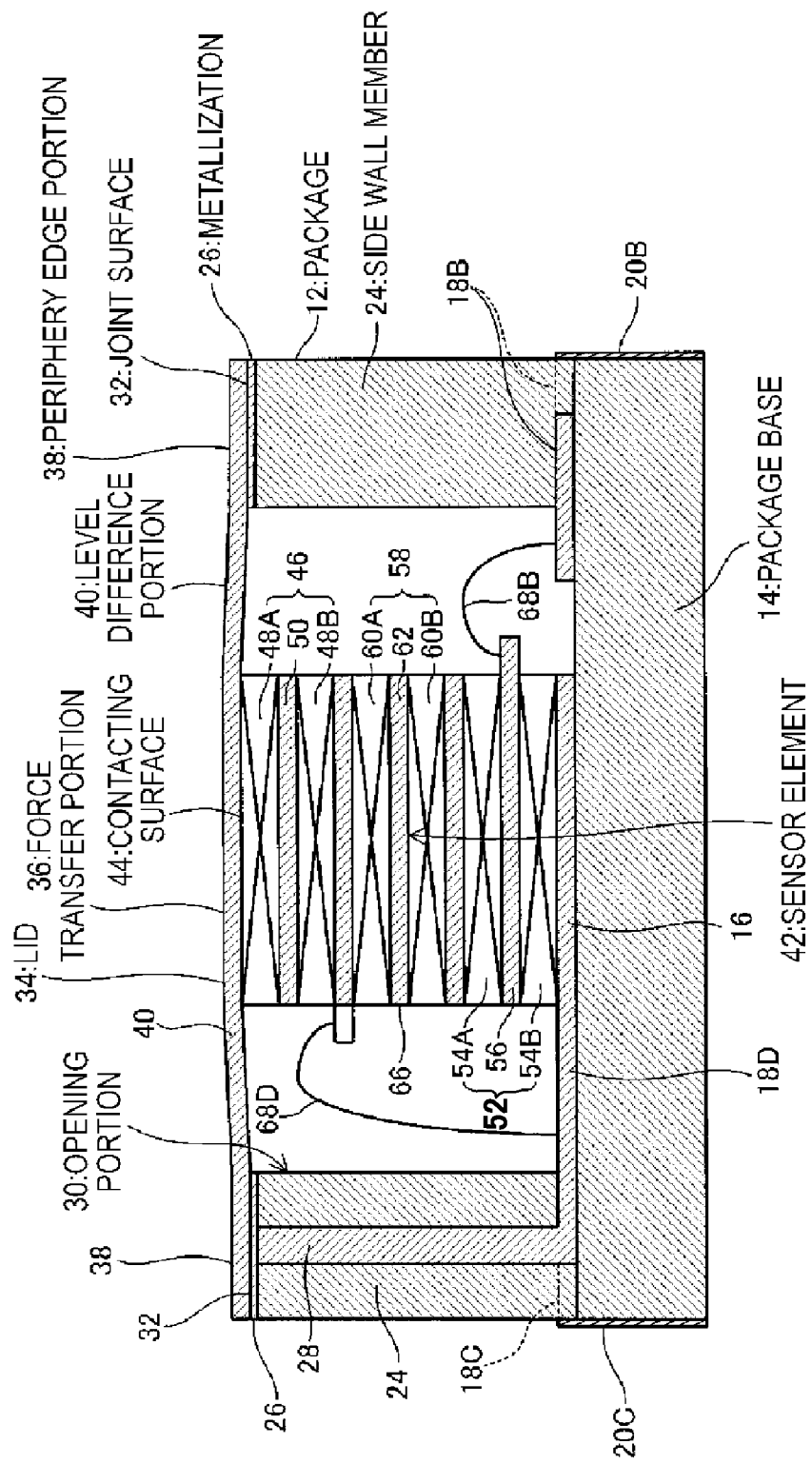
FIG. 6 is a cross-sectional view of a sensor device of a second embodiment.
Figure 7:
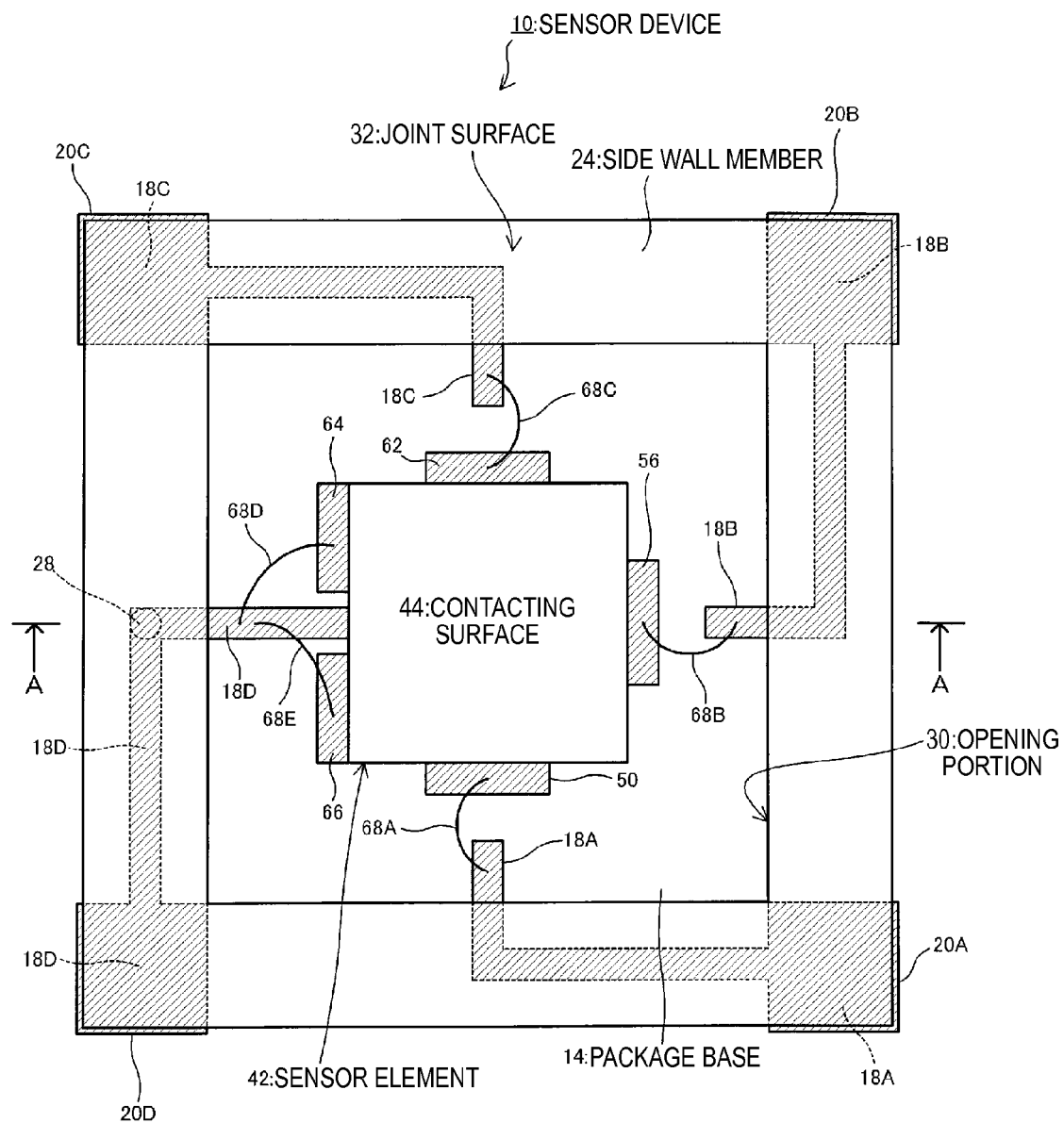
FIG. 7 is a plane view (lid is not shown) of a sensor device of a second embodiment.
Figure 8:
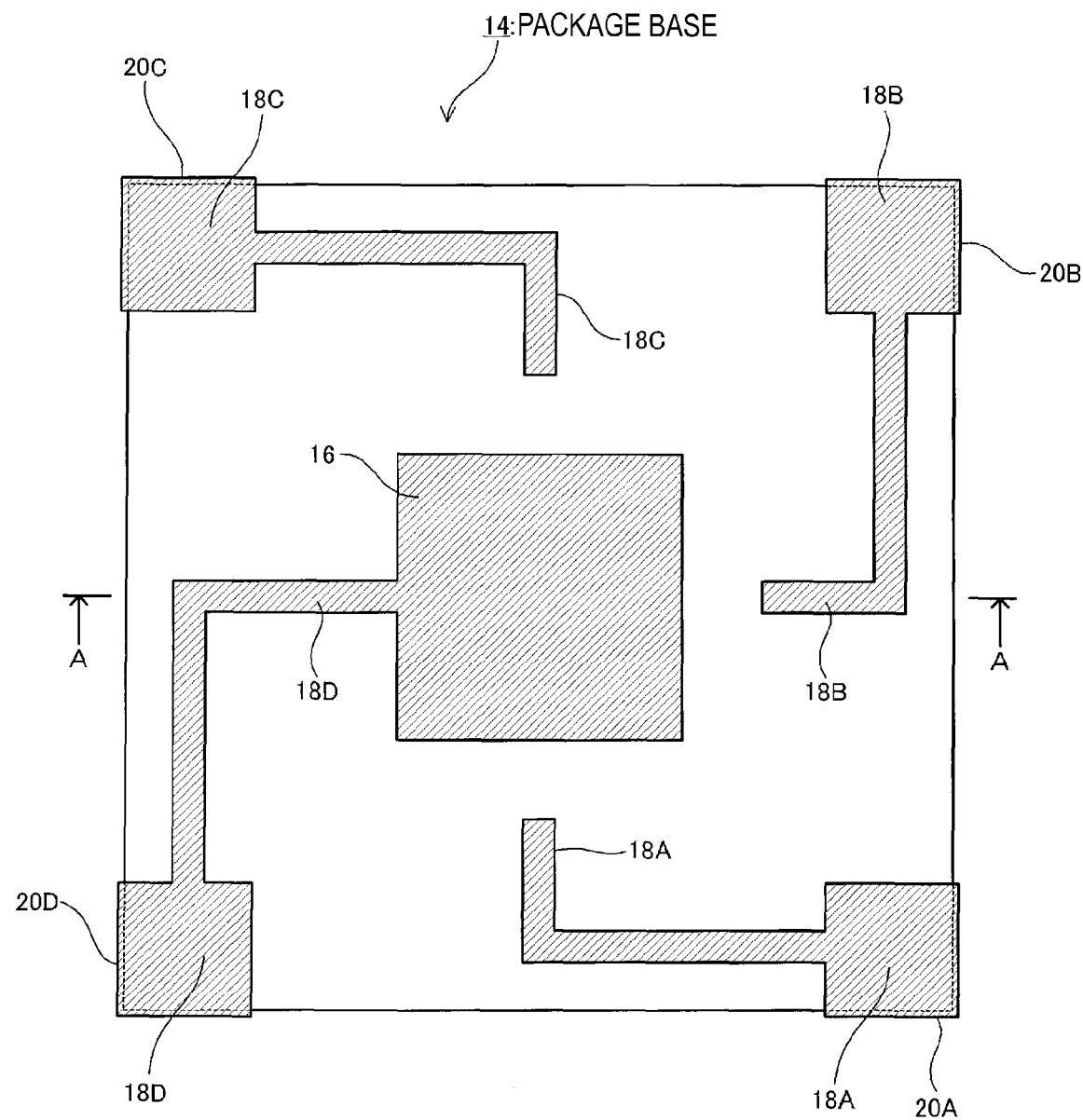
FIG. 8 is a plane view of a package base of the embodiment.

FIG. 6 shows a cross-sectional view of a sensor device of a second embodiment. FIG. 7 shows a plane view (lid is not shown) of the sensor device of the second embodiment. FIG. 8 shows a plane view of a package base of the embodiment. Herein, FIG. 6 is a cross-section taken along a line A-A of FIGS. 7 and 8. A sensor device 10 of the second embodiment is a device which senses a force in three axis directions which are perpendicular to each other, but has the common action effect with the sensor device 1 of the first embodiment.

The sensor device 10 of the embodiment is mainly configured by a package 12 (first member), a sensor element 42, and a lid 34 (second member). In the basic configuration of the sensor device 10, the sensor element 42 is accommodated in the recess of the package 12, and the lid 34 is joined to the joint surface 32 of the package 12 so as to cover an opening portion 30 of the recess of the package 12. A level difference portion 40 is formed between a force transfer portion 36 and a periphery edge portion 38 of the lid 34 according to a difference in height between the contacting surface 44 of the sensor element 42 and the joint surface 32.

The sensor device 10 of the embodiment is interposed between the pressurization plates 82 (FIG. 10) and 92 (FIG. 11) which will be described later and receives the pressure from the normal direction (γ axis direction of FIG. 9) of the contacting surface 44 of the sensor element 42.

The package 12 is formed of an insulating material such as a ceramic. The package 12 includes a package base 14 which has a flat plate shape of a rectangle (may be other shapes such as a circle) in a plan view when seen from the depth direction of the recess of the package 12 and on which the sensor element 42 is disposed. In addition, the package 12 includes a ring-shape side wall member 24 which has the same appearance with the package base 14 in the plan view (FIG. 7) and which is disposed on the package base 14 so as to cover the vicinity of the sensor element 42.

As shown in FIG. 8, a ground electrode 16 which is connected to the sensor element 42 is disposed in the center of the upper surface of the package base 14. In addition, side surface electrodes 20A, 20B, 20C, and 20D are disposed in the portions (4 portions) to be the corners of the side surface of the package base 14. The side surface electrodes 20A, 20B, 20C, and 20D are connected to an electronic circuit (not shown) which senses an output of the sensor device 10 through a wire or the like, for example.

In addition, as shown in FIGS. 6 to 8, connection electrodes 18A, 18B, 18C, and 18D are disposed on the upper surface of the package base 14. The connection electrodes 18A, 18B, 18C, and 18D are disposed so as to be connected to the side surface electrodes 20A, 20B, 20C, and 20D, respectively, and each of one ends are disposed in the position to be the corner of the package base 14. Meanwhile, the other ends of the connection electrodes 18A, 18B, and 18C are disposed in the position to be the vicinity of the ground electrode 16. The other end of the connection electrode 18D is connected to the ground electrode 16.

As shown in FIGS. 6 and 7, the side wall member 24 is laminated on the position to be the peripheral edge above the package base 14. The side wall member 24 is disposed so as to cover the connection electrodes 18A, 18B, 18C, and 18D. However, since the side wall member 24 is a member with a ring-shaped rectangle, the other end sides of the connection electrodes 18A, 18B, 18C, and 18D are exposed to the inner side of the side wall member 24, and the ground electrode 16 is also laminated on the package base 14 in an exposed state. Accordingly, the side wall member 24 forms the opening portion 30 of the recess of the package 12.

As shown in FIG. 6, metallization 26 is disposed on the upper surface of the side wall member 24, and this becomes the joint surface 32 of the package 12 (side wall member 24). As shown in FIGS. 6 and 7, a penetration electrode 28 which penetrates the side wall member 24 in the height direction is disposed in the position opposing to the connection electrode 18D of the side wall member 24, and the metallization 26 and the connection electrode 18D are electrically connected through the penetration electrode 28.

The ground electrode 16 and the connection electrodes 18A, 18B, 18C, and 18D are formed of a metal having a conductive property, and the metallization 26 can also be formed of the same material as the ground electrode 16 or the like.

As shown in FIG. 6, the lid 34 is configured by the force transfer portion 36, the peripheral edge portion 38, and the level difference portion 40, in the same manner as the lid 2 of the first embodiment. In the embodiment, the contacting surface 44 is disposed higher than the joint surface 32 of the package 12, in the same manner as the first embodiment. Accordingly, the level difference portion 40 is deformed according to the difference in height between the contacting surface 44 and the joint surface 32, the force transfer portion 36 comes in contact with the contacting surface 44, and the peripheral edge portion 38 is joined to the joint surface 32 (metallization 26) by the seam welding. Accordingly, the lid 34 has a level difference in a state where the force transfer portion 36 protrudes more than the peripheral edge portion 38. The lid 34 is electrically connected to the connection electrode 18D through the metallization 26 and the penetration electrode 28. The step of joining the lid 34 of the sensor device 10 of the second embodiment is same as the first embodiment.

As shown in FIG. 6, the sensor element 42 is a plate-like substrate having piezoelectricity formed of, for example, a crystal, piezoelectric zirconate titanate (PZT: Pb(Zr,Ti)O$_3$), lithium niobate, lithium tantalite or the like, and in the embodiment, a crystal plate is used as the piezoelectric body. The sensor element 42 is obtained by laminating, from the top, a first sensor element 46, a third sensor element 58, and a second sensor element 52 in order. The first sensor element 46 is formed so that a first sensing electrode 50 is interposed between first crystal plates 48A and 48B, the second sensor element 52 is formed so that a second sensing electrode 56 is interposed between second crystal plates 54A and 54B, and the third sensor element 58 is formed so that a third sensing electrode 62 is interposed between third crystal plates 60A and 60B.

A first ground electrode 64 is disposed between the first sensor element 46 (first crystal plate 48B) and the third sensor element 58 (third crystal plate 60A) and a second ground electrode 66 is disposed between the third sensor element 58 (third crystal plate 60B) and the second sensor element 52 (second crystal plate 54A). Further, the upper surface of the first sensor element 46 (first crystal plate 48A) is set as the contacting surface 44 of the sensor element 42, and comes in contact with the force transfer portion 36 of the lid 34 to be grounded. The lower surface of the second sensor element (second crystal plate 54B) is connected to the ground electrode 16 to be grounded.

As shown in FIG. 7, the first sensing electrode 50, the second sensing electrode 56, the third sensing electrode 62, the first ground electrode 64, and the second ground electrode 66 are disposed so that each of parts thereof protrudes from the first to third crystal plates. The first sensing electrode 50 is connected to the exposed portion (other end side) of the connection electrode 18A by a conductive wire 68A, the second sensing electrode 56 is connected to the exposed portion (other end side) of the connection electrode 18B by a wire 68B, and the third sensing electrode 62 is connected to the exposed portion (other end side) of the connection electrode 18C by a wire 68C. In addition, the first ground electrode 64 and the second ground electrode 66 are connected to the exposed portion (other end side) of the connection electrode 18D by wires 68D and 68E, respectively.

According to the connections described above, the side surface electrode 20A is electrically connected to the first sensing electrode 50 through the connection electrode 18A and the wire 68A. The side surface electrode 20B is electrically connected to the second sensing electrode 56 through the connection electrode 18B and the wire 68B. The side surface electrode 20C is electrically connected to the third sensing electrode 62 through the connection electrode 18C and the wire 68C.

In addition, the side surface electrode 20D is electrically connected to the ground electrode 16 through the connection electrode 18D. Further, the side surface electrode 20D is electrically connected to the first ground electrode 64 through the wire 68D which is connected to the connection electrode 18D, is electrically connected to the second ground electrode 66 through the wire 68E which is connected to the connection electrode 18D, and is electrically connected to the lid 34 through the penetration electrode 28 which is connected to the connection electrode 18D and the metallization 26.

As the materials of the various electrodes described above, an elemental substance of gold, titanium, aluminum, copper, or iron, or an alloy thereof can be used. For example, stainless steel can be used as an iron alloy and it is preferably used since it has superior durability and corrosion resistance.

Figure 9:
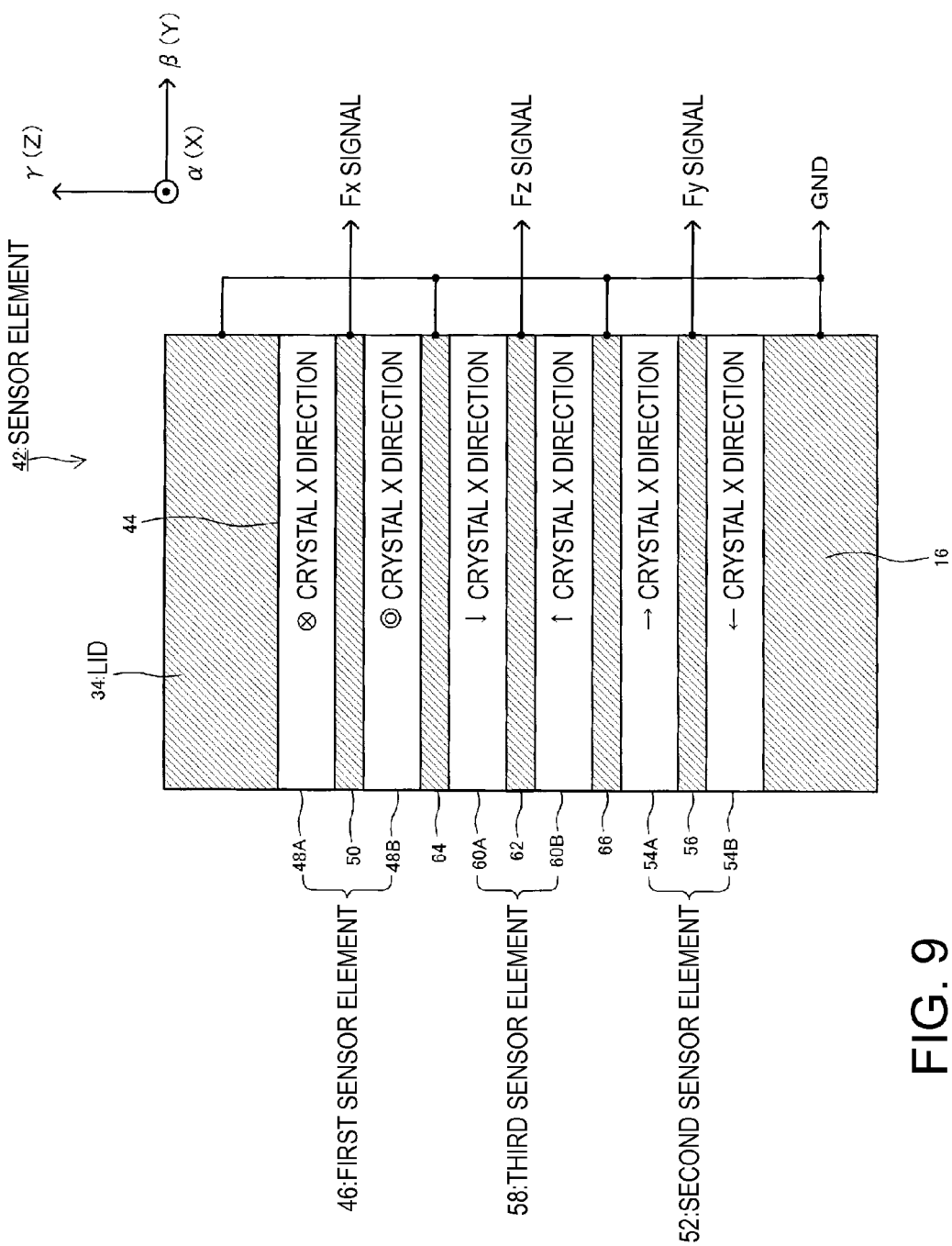
FIG. 9 is a schematic view of a sensor element of the embodiment.

FIG. 9 shows a schematic view of the sensor element of the embodiment. In the embodiment, the force transfer portion 36 can transfer not only the force in a direction parallel to the normal direction (γ axis) of the contacting surface 44 of the sensor element 42, but also a force in the surface direction of the contacting surface 44, that is, a force in two directions (α axis and β axis) which are perpendicular to γ axis, respectively, and perpendicular to each other, to the contacting surface 44. The sensor element 42 (first sensor element 46, second sensor element 52, and third sensor element 58) can sense the forces in directions parallel to the α axis, the β axis, and the γ axis which will be described later.

In the first sensor element 46, the first crystal plates 48A and 48B are formed of a Y-cut crystal plate, and include a crystal orientation in which the X direction which is a crystal orientation generating the piezoelectric effect is a direction which is perpendicular to the normal line (direction parallel to the γ axis of FIG. 9) of the first crystal plates 48A and 48B. The first crystal plates 48A and 48B are disposed so that the X directions are inverse directions from each other. In addition, the first crystal plates 48A and 48B are disposed so that the X directions are parallel to the α axis of Cartesian space.

In the second sensor element 52, the second crystal plates 54A and 54B are formed of a Y-cut crystal plate, and include a crystal orientation in which the X direction is perpendicular to the normal line (direction parallel to the γ axis) of the second crystal plates 54A and 54B. The second crystal plates 54A and 54B are disposed so that the X directions are inverse directions from each other. In addition, the second crystal plates 54A and 54B are disposed so that the X directions are parallel to the β axis of Cartesian space.

In the third sensor element 58, the third crystal plates 60A and 60B are formed of an X-cut crystal plate, and includes a crystal orientation in which the X direction is parallel to the normal line (direction parallel to the γ axis) of the third crystal plates 60A and 60B. The third crystal plates 60A and 60B are disposed so that the X directions are inverse directions from each other. In addition, the third crystal plates 60A and 60B are disposed so that the X directions are parallel to the γ axis of Cartesian space.

As shown in FIG. 9, in the sensor element 42 of the embodiment, the direction parallel to the γ axis of Cartesian space is set as a height direction of the sensor device 10. For example, the sensor element 42 is interposed between the pressurization plates 82 (FIG. 10) and 92 (FIG. 11) which will be described later, receives the pressure from the direction of the γ axis, and receives the pressure from the direction parallel to the γ axis through the lid 34 (force transfer portion 36). Accordingly, since the third crystal plates 60A and 60B receive the pressure (compression force) from the X direction, an electric charge is induced by the piezoelectric effect, and the electric charge (Fz signal) is output to the third sensing electrode 62.

In the configuration, if an external force, by which the relative positions of two pressurization plates deviate from each other in the direction parallel to the α axis, is applied, the external force in the direction parallel to the α axis is applied to the sensor element 42 through the force transfer portion 36. Then, since the first crystal plates 48A and 48B receive the external force (shear force) from the X direction, an electric charge is induced by the piezoelectric effect, and the electric charge (Fx signal) is output to the first sensing electrode 50.

If an external force, by which the relative positions of two pressurization plates deviate in the direction parallel to the β axis from each other, is applied, the external force in the direction parallel to the β axis is applied to the sensor element 42 through the force transfer portion 36. Then, since the second crystal plates 54A and 54B receive the external force (shear force) from the X direction, an electric charge is induced by the piezoelectric effect, and the electric charge (Fy signal) is output to the second sensing electrode 56.

Further, if an external force, by which the relative positions of two pressurization plates deviate in the direction parallel to the γ axis from each other, is applied, the external force in the direction parallel to the γ axis is applied to the sensor element 42 through the force transfer portion 36. Then, since the third crystal plates 60A and 60B receive the external force (force of compression or tension) from the X direction, the amount of the electric charge induced from the piezoelectric effect is changed, and the electric charge (Fz signal) which is output to the third sensing electrode 62 is changed in magnitude.

Accordingly, the sensor device 10 of the embodiment can monitor each of the electric charge (Fx signal) which is output to the first sensing electrode 50 through the side surface electrode 20A, the electric charge (Fy signal) which is output to the second sensing electrode 56 through the side surface electrode 20B, and the electric charge (Fz signal) which is output to the third sensing electrode 62 through the side surface electrode 20C, and it is possible to sense the external forces (Fx, Fy, and Fz) in the directions parallel to the α axis (the X axis which will be described later), the β axis (the Y axis which will be described later), and the γ axis (the Z axis which will be described later) which are perpendicular to each other. The sensor element 42 has a laminated structure of the first sensor element 46, the second sensor element 52, and the third sensor element 58, however, it may have a configuration using at least one or more thereof. In addition, it is not necessary to laminate the first sensor element 46, the second sensor element 52, and the third sensor element 58, and a structure in which the sensor elements are accommodated in the package 12 in parallel with each other and the upper surface (contacting surface) of each sensor element comes in contact with the force transfer portion 36, may be used.

Figure 10:
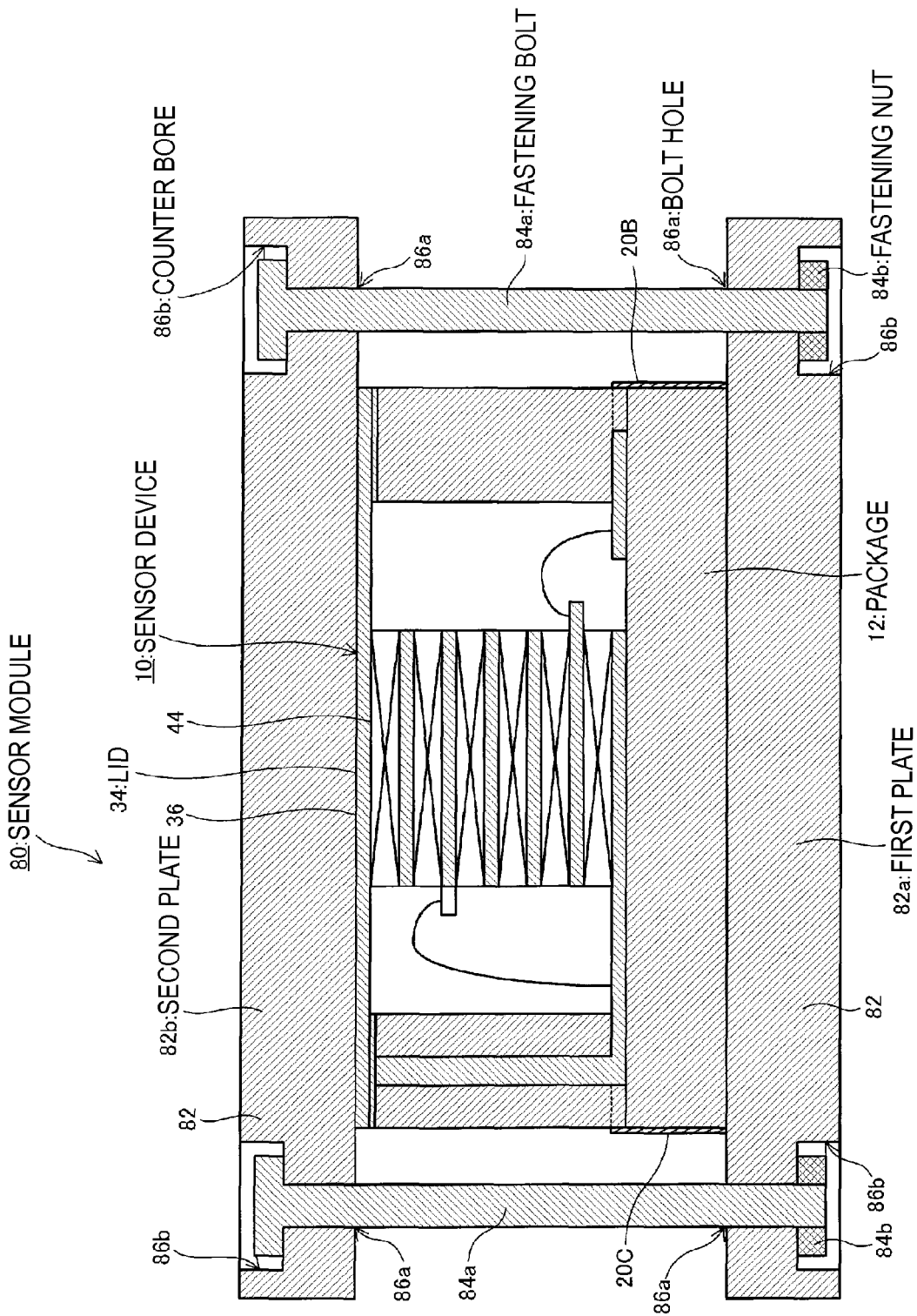
FIG. 10 is a cross-sectional view of a sensor module of the embodiment.

FIG. 10 shows a cross-sectional view of a sensor module of the embodiment. The sensor module of the embodiment has a configuration in which the sensor device 10 of the second embodiment (may be the sensor device 1 of the first embodiment) is interposed between the pressurization plates 82, and the pressurization plates 82 are fastened to each other by a fastening portion, and the pressure is applied to the sensor device 10.

The pressurization plates 82 are configured by a first plate 82a which comes in contact with the package 12 and a second plate 82b which comes in contact with the lid 34 (force transfer portion 36). The fastening portion is configured by a fastening bolt 84a and a fastening nut 84b. In addition, a bolt hole 86a to which the fastening bolt 84a is inserted is formed in the first plate 82a and the second plate 82b, and a counter bore 86b which accommodates the head portion of the fastening bolt 84a and the fastening nut 84b is formed in communication with the bolt hole 86a.

Herein, in a state where the sensor device 10 is interposed between the first plate 82a and the second plate 82b, the fastening bolt 84a is inserted to the bolt hole 86a and bolting is performed by the fastening bolt 84a and the fastening nut 84b. Then, the sensor device 10 receives a force in a direction making the first plate 82a and the second plate 82b approach each other due to the fastening portion, and receives pressure from the height direction, and thus, the lid 34 (force transfer portion 36) configuring the sensor device 10 applies the pressure to the contacting surface 44 of the sensor element 42.

In the same manner as described above, the side surface electrodes 20A, 20B, 20C, and 20D are connected to an electronic circuit (not shown) which receives the signal from the sensor device 10. Accordingly, if an external force is applied to the pressurization plates 82, the external force is transferred to the contacting surface 44 through the force transfer portion 36 to change the force to be received by the contacting surface 44, and accordingly, the output of the signal to be output from the sensor device 10 changes. Accordingly, it is possible to sense the force (including the direction) applied to the sensor module 80 by monitoring the amount of change in the output of signal thereof, with an output of the signal in a case of only the pressurization as a reference. The electronic circuit (not shown) may be built in a position opposing to the sensor device 10 of the first plate 82a, the side surface electrodes 20A, 20B, 20C, and 20D of the sensor device 10 may be exposed up to the lower surface of the package 12, and mounted electrodes (not shown) on the electronic circuit (not shown) can be connected to the portions of the side surface electrodes exposed to the lower surface of the package 12 by soldering or the like.

Figure 11:
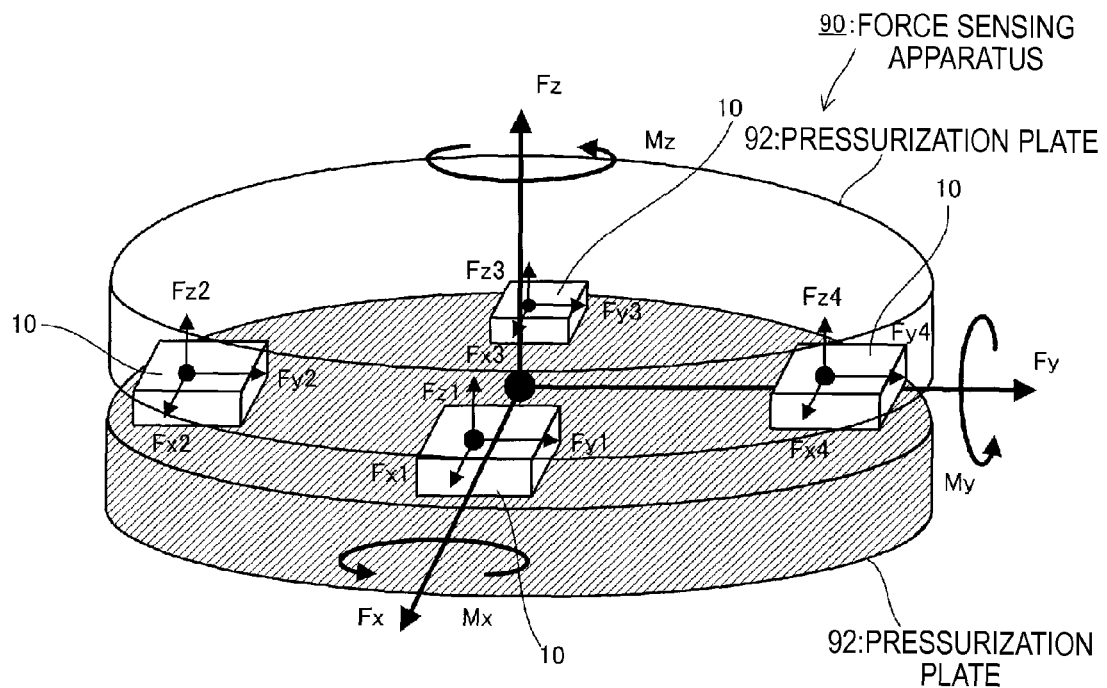
FIG. 11 is a schematic view of a force sensing apparatus of the embodiment.

FIG. 11 shows a schematic view of a force sensing apparatus of the embodiment. A force sensing apparatus 90 of the embodiment has a configuration in which the four sensor devices 10 are interposed between two pressurization plates 92. An electronic circuit (not shown) which is electrically connected to the sensor devices 10 through a wire or the like is disposed in one pressurization plate 92 of the pressurization plates 92. In the force sensing apparatus 90, the four sensor devices 10 are interposed between the pressurization plates 92 in a state where all of the sensor devices 10 face the same direction, and receive the pressure. For example, the sensor devices 10 are in a state where a sensing axis of the first sensor element 46 (FIG. 9) faces a direction parallel to the Fx, a sensing axis of the second sensor element 52 (FIG. 9) faces a direction parallel to the Fy, and a sensing axis of the third sensor element 58 (FIG. 9) faces a direction parallel to the Fz.

Herein, in a case of receiving a force by which the relative positions of the pressurization plates 92 deviate in the Fx direction from each other, the sensor devices 10 sense forces of Fx1, Fx2, Fx3, and Fx4. In a case of receiving a force by which the relative positions of the pressurization plates 92 deviate in the Fy direction from each other, the sensor devices 10 sense forces of Fy1, Fy2, Fy3, and Fy4. In addition, in a case of receiving a force by which the relative positions of the pressurization plates 92 deviate in the Fz direction from each other, the sensor devices 10 sense forces of Fz1, Fz2, Fz3, and Fz4. The pressurization plates 92 can perform a relative displacement to deviate in a direction rotating around the X axis (Mx) from each other, a relative displacement to deviate in a direction rotating around the Y axis (My) from each other, and a relative displacement to deviate in a direction rotating around the Z axis (Mz) from each other, and the forces accompanied with this can be transferred to the sensor device 10.

Accordingly, in the force sensing apparatus 90, the forces Fx, Fy, and Fz which are perpendicular to each other, and a rotating force Mx with a direction parallel to the Fx as a rotating axis, a rotating force My with a direction parallel to the Fy as a rotating axis, and a rotating force Mz with a direction parallel to the Fz as a rotating axis can be obtained as follows.

$Fx=Fx1+Fx2+Fx3+Fx4$ $Fy=Fy1+Fy2+Fy3+Fy4$ $Fz=Fz1+Fz2+Fz3+Fz4$ $Mx=b\times(Fz4-Fz2)$ $My=a\times(Fz3-Fz1)$ $Mz=b\times(Fx2-Fx4)+a\times(Fy1-Fy3)$ Herein, a and b are constants. Accordingly, the force sensing apparatus 90 of the embodiment is the force sensing apparatus 90 which can sense the forces (forces in six axis directions) from the various three-dimensional directions, and stably realizes the air-tight sealing of the sensor element 42 accommodated in the package 12 over a long period.

Figure 12:
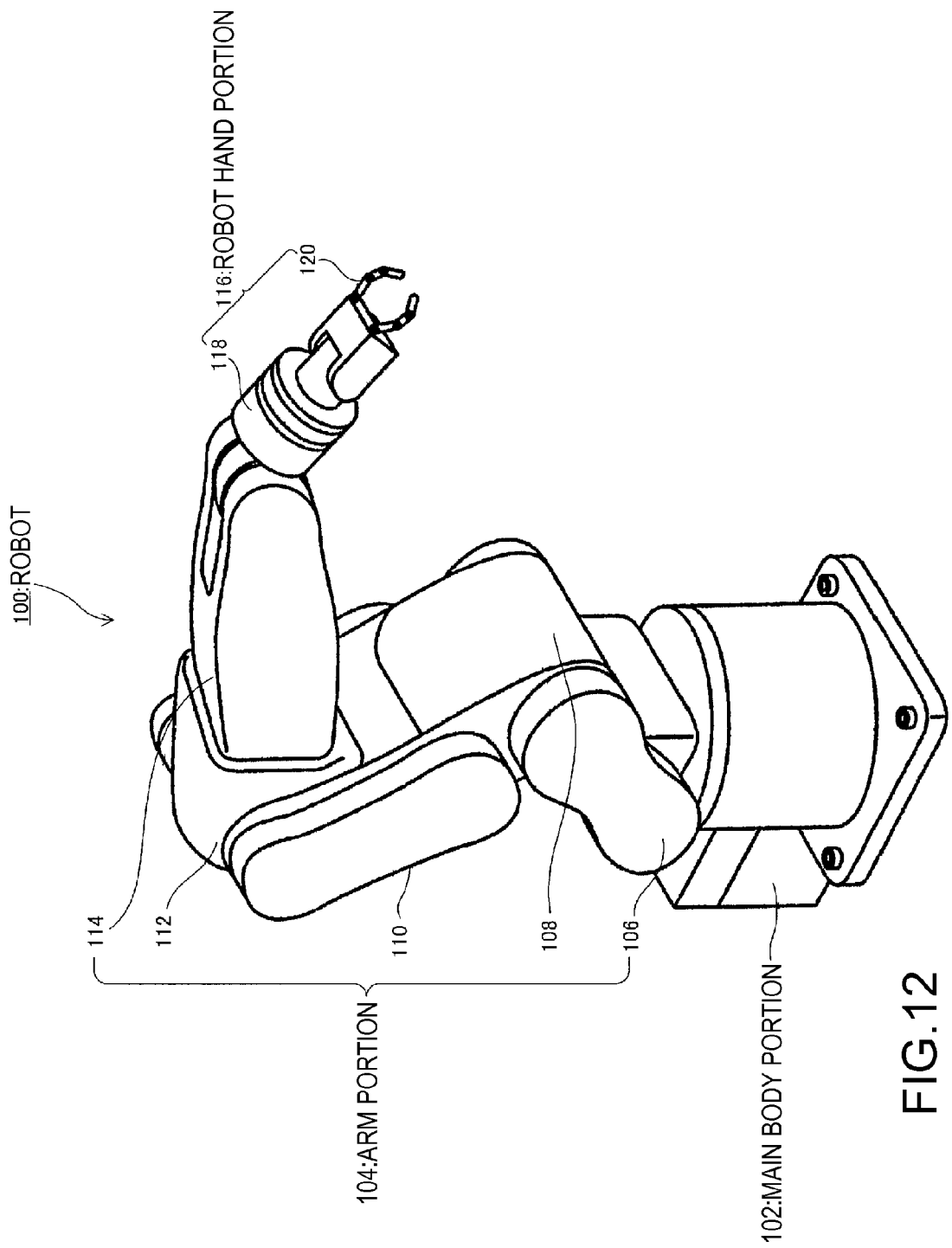
FIG. 12 is a schematic view of a robot on which a force sensing apparatus of the embodiment is mounted.

FIG. 12 shows a robot on which the force sensing apparatus of the embodiment is mounted. As shown in FIG. 12, a robot 100 is configured by a main body portion 102, an arm portion 104, a robot hand portion 116, and the like. The main body portion 102 is fixed to a floor, a wall, or a ceiling, or a movable carriage, for example. The arm portion 104 is provided to be movable compared to the main body portion 102, and an actuator (not shown) generating power for rotating the arm portion 104 or a control unit (not shown) which controls the actuator and the like are embedded in the main body portion 102.

The arm portion 104 is configured by a first frame 106, a second frame 108, a third frame 110, a fourth frame 112, and a fifth frame 114. The first frame 106 is rotatably or bendably connected to the main body portion 102, through a rotating and bending axis. The second frame 108 is connected to the first frame 106 and the third frame 110, through a rotating and bending axis. The third frame 110 is connected to the second frame 108 and the fourth frame 112, through a rotating and bending axis. The fourth frame 112 is connected to the third frame 110 and the fifth frame 114, through a rotating and bending axis. The fifth frame 114 is connected to the fourth frame 112, through a rotating and bending axis. The arm portion 104 is driven by a complex rotation or bending of each frame around each rotating and bending axis under the control of the control unit.

A robot hand portion 116 is attached to the distal end of the fifth frame 114, and the robot hand 120 which can hold an object is connected to the fifth frame 114 through a robot hand connection portion 118 in which a motor (not shown) for rotating motion is embedded.

The force sensing apparatus 90 (FIG. 11) described above is embedded in the robot hand connection portion 118 in addition to the motor, and when the robot hand portion 116 is moved to a predetermined motion position under the control of the control unit, contacting an obstacle, contacting an object due to a motion command passing a predetermined position, and the like can be sensed by the force sensing apparatus 90 as the forces, and can be fed back to the control unit of the robot 100, and then, an avoidance motion can be performed.

By using the robot 100 described above, obstacle avoidance motion, damaging object avoidance motion, and the like which are difficult to be handle with the position control of the related art, can be easily performed, and it is possible to provide the robot 100 capable of safe and complicated operations. It is possible to provide the robot 100 in which the sensing of the force can be stably performed with a high degree of precision even with a small amount of displacement. In addition, the invention can be also applied to a dual-arm robot, without limiting the embodiment.

The entire disclosure of Japanese Patent Application No. 2011-278969, filed Dec. 20, 2011, is expressly incorporated by reference herein.

What is claimed is:

1. A sensor device comprising:
   a first member that includes a recess;
   a sensor element that is disposed on a bottom surface of the recess and that includes a piezoelectric body; and
   a second member that is joined to a peripheral area of the first member and that seals the recess of the first member, wherein
   a depth of the recess is smaller than a height of the sensor element so that a top contacting surface of the sensor element extends further than a top joined surface of the peripheral area of the first member,
   an entirety of the top contacting surface of the sensor element contacts with the second member,
   the second member is inclined from the top contacting surface of the sensor member toward the top joined surface of the peripheral area of the first member, and
   when a normal direction of the top contacting surface is set as a γ axis direction, and directions which are perpendicular to the γ axis direction and perpendicular to each other are set as a α axis direction and a β axis direction, respectively, the sensor element includes at least one or more of a first sensor element that senses a force in the α axis direction, a second sensor element that senses a force in the β axis direction, and a third sensor element that senses a force in the γ axis direction.

2. A sensor module comprising:
   a first member that includes a recess;
   a sensor element that is disposed on a bottom surface of the recess and that includes a piezoelectric body;

a second member that is joined to a peripheral area of the first member and that seals the recess of the first member; and an electronic circuit that is electrically connected to the sensor element, wherein a depth of the recess is smaller than a height of the sensor element so that a top contacting surface of the sensor element extends further than a top joined surface of the peripheral area of the first member, an entirety of the top contacting surface of the sensor element contacts with the second member, the second member is inclined from the top contacting surface of the sensor member toward the top joined surface of the peripheral area of the first member, and when a normal direction of the top contacting surface is set as a $\gamma$ axis direction, and directions which are perpendicular to the $\gamma$ axis direction and perpendicular to each other are set as a $\alpha$ axis direction and a $\beta$ axis direction, respectively, the sensor element includes at least one or more of a first sensor element that senses a force in the $\alpha$ axis direction, a second sensor element that senses a force in the $\beta$ axis direction, and a third sensor element that senses a force in the $\gamma$ axis direction.

* * * * *